(12) United States Patent
Heiskanen et al.

(10) Patent No.: US 10,711,198 B2
(45) Date of Patent: Jul. 14, 2020

(54) CATALYTIC UPGRADING OF PYROLYTIC VAPORS

(71) Applicants: Valmet Technologies Oy, Espoo (FI); Fortum Oyj, Espoo (FI)

(72) Inventors: Jukka Heiskanen, Espoo (FI); Sara Kaerki, Helsinki (FI); Erkki Vaelimaeki, Ruutana (FI); Reyhaneh Shenassa, Charlotte, NC (US); Jussi Maentyniemi, Yloejaervi (FI); Pekka Jokela, Espoo (FI); Andrea Gutierrez, Helsinki (FI); Joakim Autio, Kangasala (FI); Janne Asikkala, Oulu (FI)

(73) Assignee: Valmet Technologies Oy, Espoo (FI)

(*) Notice: Subject to any disclaimer, the term of this patent is extended or adjusted under 35 U.S.C. 154(b) by 23 days.

(21) Appl. No.: 15/565,375

(22) PCT Filed: Apr. 13, 2016

(86) PCT No.: PCT/FI2016/050238
§ 371 (c)(1),
(2) Date: Oct. 9, 2017

(87) PCT Pub. No.: WO2016/166413
PCT Pub. Date: Oct. 20, 2016

(65) Prior Publication Data
US 2018/0057753 A1    Mar. 1, 2018

(30) Foreign Application Priority Data

Apr. 17, 2015 (FI) ..................... 20155290

(51) Int. Cl.
*C10B 57/06* (2006.01)
*C10B 49/22* (2006.01)
(Continued)

(52) U.S. Cl.
CPC .............. *C10B 57/06* (2013.01); *C10B 49/22* (2013.01); *C10B 53/02* (2013.01); *C10B 57/18* (2013.01);
(Continued)

(58) Field of Classification Search
CPC ...... C12M 41/36; C12M 41/46; C12M 41/48; C12M 41/14; C12M 23/50; C12M 23/12;
(Continued)

(56) References Cited

U.S. PATENT DOCUMENTS

2010/0228062 A1    9/2010  Babicki et al.
2012/0073185 A1*   3/2012  Jokela .................... C10B 49/16
                                                                      44/307
(Continued)

FOREIGN PATENT DOCUMENTS

CN    103380196 A    10/2013
RU    2013141532 A   4/2015
(Continued)

OTHER PUBLICATIONS

Finnish Patent and Registration Office, Office Action for Application No. 20155290, dated Oct. 26, 2015, 6 pages, Finland.
(Continued)

*Primary Examiner* — Ali Z Fadhel
(74) *Attorney, Agent, or Firm* — Alston & Bird LLP

(57) ABSTRACT

A method for forming catalytically treated pyrolytic vapor product from pyrolyzable material, the method comprising burning fuel in a fluidized bed boiler, thereby heating some particulate material; transferring at least some of the heated particulate material or some other heated particulate material to a pyrolysis reactor to pyrolyze some pyrolyzable material in the pyrolysis reactor; and conveying at least some pyrolytic vapor through a catalyst bed comprising catalyst material; and conveying at least part of the formed side products
(Continued)

upstream back to the process; thereby producing the catalytically treated pyrolytic vapor product in an resource efficient manner. In addition, a system configured to produce catalytically treated pyrolytic vapor product from pyrolyzable material. The system comprises a fluidized bed boiler; a pyrolysis reactor; a catalytic reactor; means for conveying some heated particulate material to the pyrolysis reactor; a pipeline for conveying at least some pyrolytic vapor from the pyrolysis reactor into the catalytic reactor and means for conveying at least part of the formed side products upstream back to the process for recovering heat and chemical energy bound to the side products.

11 Claims, 9 Drawing Sheets

(51) Int. Cl.
*C10B 53/02* (2006.01)
*C10K 3/02* (2006.01)
*C10G 9/32* (2006.01)
*C10K 1/02* (2006.01)
*C10B 57/18* (2006.01)
*C10G 3/00* (2006.01)

(52) U.S. Cl.
CPC .................. *C10G 3/42* (2013.01); *C10G 3/50* (2013.01); *C10G 9/32* (2013.01); *C10K 1/02* (2013.01); *C10K 3/02* (2013.01); C10G 2300/1003 (2013.01); C10G 2300/1014 (2013.01); C10G 2300/202 (2013.01); Y02E 50/14 (2013.01); Y02P 20/124 (2015.11); Y02P 30/20 (2015.11)

(58) Field of Classification Search
CPC ......... C10B 57/06; C10B 57/18; C10B 53/02; C10B 49/22; C10K 1/02; C10K 3/02; C10G 9/32; C10G 3/50; C10G 3/42; C10G 2300/202; C10G 2300/1014; C10G 2300/1003; Y02P 30/20; Y02P 20/124; Y02E 50/14
See application file for complete search history.

(56) References Cited

U.S. PATENT DOCUMENTS

| | | | |
|---|---|---|---|
| 2013/0017460 A1* | 1/2013 | Keefer | B01D 53/047 429/419 |
| 2013/0030064 A1* | 1/2013 | Jiang | B01J 19/00 518/703 |
| 2014/0230318 A1 | 8/2014 | Liu et al. | |

FOREIGN PATENT DOCUMENTS

| WO | WO 2012/109035 A2 | 8/2012 | |
|---|---|---|---|
| WO | WO 2014/006273 A1 | 1/2014 | |
| WO | WO 2014/204302 A1 | 12/2014 | |
| WO | WO-2014204302 A1 * | 12/2014 | ............... C10G 1/06 |
| WO | WO 2015/104430 A1 | 7/2015 | |

OTHER PUBLICATIONS

International Searching Authority, International Search Report and Written Opinion for International Application No. PCT/FI2016/050238, dated Jun. 20, 2016, 9 pages, European Patent Office, Netherlands.
International Preliminary Examing Authority, International Preliminary Report on Patentability for International Application No. PCT/FI2016/050238, dated Jun. 14, 2017, 46 pages, European Patent Office, Netherlands.
International Preliminary Examining Authority, Written Opinion (second) for International Application No. PCT/FI2016/050238, dated Mar. 6, 2017, 7 pages, European Patent Office, Netherlands.
European Patent Office, Communication puruant to Article 94(3) EPC for Application No. 16722260.3, dated Oct. 25, 2018, 6 pages, Netherlands.
Nikparsaa, P., et al., "Effect of reaction conditions and Kinetic study on the Fischer-Tropsch synthesis over fused Co—Ni/$Al_2O_3$ catalyst", *Journal of Fuel Chemistry and Technology*, Jun. 2014, pp. 710-718, vol. 42, No. 6, Elsevier Limited, NL.
Federal Service for Intellecual Property, Russian Office Action for Application No. 2017135146/04 (061455), dated Jul. 11, 2019, (10 pages), Moscow, Russia.

* cited by examiner

CATALYTIC UPGRADING OF PYROLYTIC VAPORS

CROSS REFERENCE TO RELATED APPLICATIONS

This application is a National Stage Application, filed under 35 U.S.C. 371, of International Application No. PCT/FI2016/050238, filed Apr. 13, 2016, which claims priority to Finnish Application No. 20155290, filed Apr. 17, 2015; the contents of both of which as are hereby incorporated by reference in their entirety.

BACKGROUND

Related Field

The invention relates to a method for producing catalytically treated pyrolytic vapor, the pyrolytic vapor obtained from pyrolysis of pyrolyzable materials, such as biomass and/or residue derived material. The invention relates to a system for performing the method. The invention relates to a method for producing pyrolytic product of high quality, the pyrolytic product being widely applicable, e.g. as substitute for fossil fuels and/or as a feed for biochemical production.

DESCRIPTION OF RELATED ART

Pyrolysis is a process, wherein some carbon comprising material is heated in a pyrolysis reactor at an elevated temperature and in the absence of free oxygen ($O_2$) to form raw pyrolytic vapors. Char is produced as a side product. The elevated temperature typically ranges in between 400° C. and 700° C. Pyrolytic vapors typically comprise condensable vapors, which can be condensed to pyrolytic oil. Such pyrolytic oil typically has high acidity and high viscosity, and it is relatively unstable, these properties being a result of e.g. oxygen being bound to the constituents.

Typically pyrolysis takes place by heating a pyrolysis reactor, whereby the biomass arranged inside the reactor will be pyrolyzed. Heating the pyrolysis reactor together with the pyrolyzable biomass requires a lot of energy. Therefore, an efficient energy source is needed.

Because of the aforementioned properties, conventional pyrolysis oil can mainly be used to produce energy, i.e. as a fuel in combustors. For environmental reasons, there is a trend of using renewable materials to substitute some fossil material in a variety of applications, including oil industry. Substituting some fossil oil products with renewable bio-oil requires the bio-oil to have high quality in terms of acidity (which should be low), stability (which should be better), and viscosity (which should be suitable for use, typically relatively small). Therefore, the quality of the pyrolytic products should be high. The quality is related e.g. to the oxygen content (as will be defined later) of the pyrolytic vapors.

The quality of some pyrolytic products can be improved by hydrotreatment, i.e. a catalytic treatment at a high temperature, under a high pressure, and with the presence of reasonable amount of hydrogen. However, vessels that withstand both high temperature and pressure are expensive. Moreover, hydrogen is expensive. In this way, a known catalytic treatment imposes so high investment and use costs, that these may not be feasible from the point of view of commercially producing fuels from pyrolytic products.

Catalytic pyrolysis and hydrotreatment of fast pyrolysis oil improves the quality of pyrolysis oil. The problem with such techniques relates to the efficiency of the process where significant amounts of by-products are formed due to deoxygenation of pyrolysis oil. Catalytic pyrolysis also suffers from inefficiency while the catalyst is usually exposed to the impurities of e.g. biomass causing irreversible deactivation and thereby high consumption of catalytic material.

Thus, poor quality of pyrolytic vapors and inefficient use of raw materials and side products is a problem with known pyrolysis systems. Moreover, some methods towards a solution are too inefficient for practical use.

BRIEF SUMMARY

An object of the invention is to improve, in a cost effective way, the efficiency of the pyrolysis process or system capable of producing high quality pyrolytic products; efficiency in relation to the amount of raw materials used and heat flows produced and used. Herein the raw materials include the pyrolyzable material and the materials needed to heat the materials in the pyrolysis and the heat flows produced include the heat flows from pyrolysis and other parts of the process.

In addition another object of the invention is to improve the process with regard to the lifetime of the catalyst used in the process thereby increasing the availability and efficiency as well as decreasing the need for catalyst replacement and thus decreasing the catalyst consumption.

In order to improve the quality of the pyrolytic product, it has been found that pyrolytic vapors can be catalytically treated. It has also been observed that the deactivation of the catalysts is reduced, when the vapors are treated catalytically, compared to e.g. treating the biomass catalytically in a pyrolysis reactor.

In order to efficiently use the side products of the catalytic treatment, it has been found, that the side products can efficiently be burned and/or their heat can be recovered in a boiler arranged in connection with other parts of the system, such as the catalytic reactor, a catalyst regenerator, or a condenser.

In particular, it has been found that an integrated fluidized bed boiler serves well for the purpose. A fluidized bed boiler can not only be used to efficiently recover heat from the side products, but also an integrated fluidized bed heat source is an efficient way of heating the pyrolyzable material, such as biomass. Still further, some catalysts work efficiently also without external hydrogen, and at a low pressure, whereby they can be cost effectively used.

By way of using a fluidized bed boiler as the heat source, the heat and/or reaction heat (i.e. chemical energy) of the aforementioned side products can be used both for the pyrolysis and for other purposes, such as for production of electricity and/or for district heating. The need for each of these products (i.e. pyrolytic product, heat, electricity) may depend on various things, such as temperature and/or season. In this way, efficient use of raw materials according to these needs is also achieved by the embodiments of the invention.

The invention is primarily characterized by the independent claims. Beneficial embodiments are disclosed in dependent claims and the appended examples.

DETAILED DESCRIPTION OF VARIOUS EMBODIMENTS

FIGS. 1-8 show embodiments of a pyrolysis system, i.e. a system suitable for producing and configured to produce treated pyrolysis vapor product from pyrolyzable material in a resource efficient manner. The vapor may be upgraded or post treated, as will be detailed below. As shown in the figures, such a system comprises a fluidized bed boiler 100, a pyrolysis reactor 200, and a catalytic reactor 400 arranged to catalytically treat, in a catalyst bed 410, pyrolytic vapors produced in the pyrolysis reactor 200.

In the process, both energy and pyrolysis raw materials are utilized in a resource efficient manner. Thus, in the process
- at least some of the side products formed are fed back to the process and/or
- at least some of the different heats formed are utilized in the process; optionally to produce electricity and/or utilizable heat for production of district heat, drying or for other industrial processes.

Figure 3:
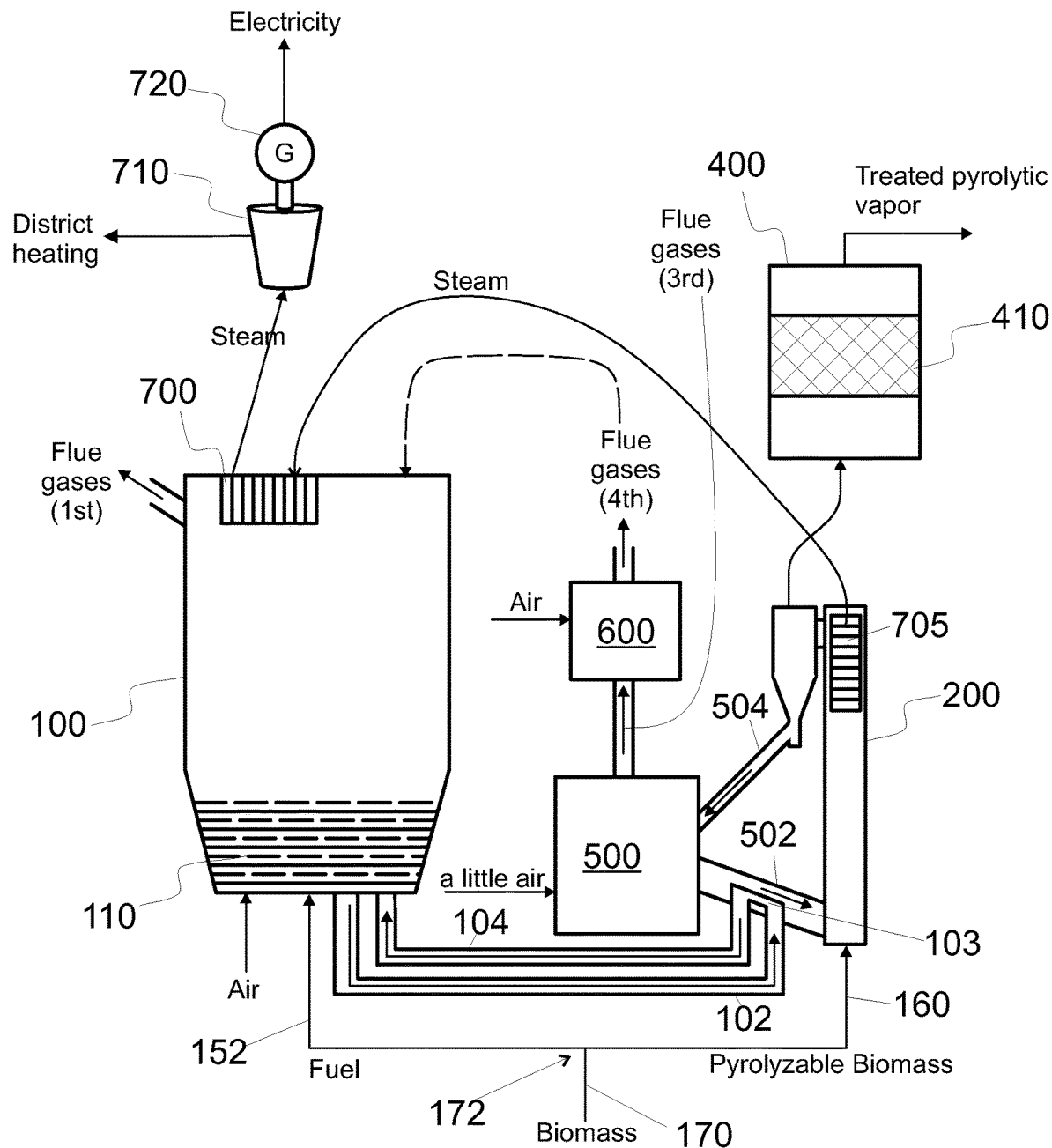
FIG. 3 shows a system configured to produce treated pyrolytic vapor product from pyrolyzable material, the system having a bubbling fluidized bed boiler integrated with a char burner and a fixed catalyst bed.
Figure 4:
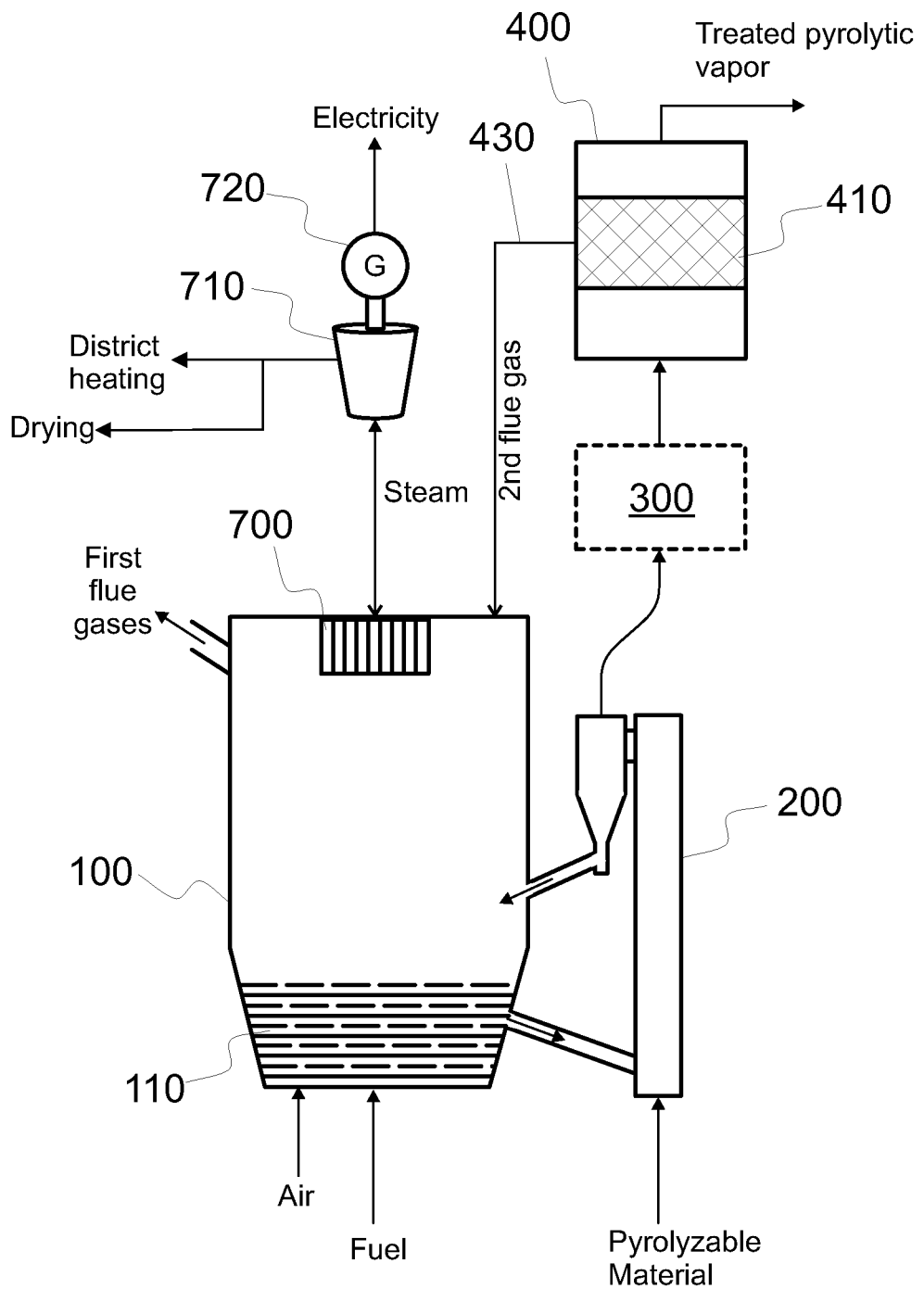
FIG. 4 shows a system configured to produce treated pyrolytic vapor product from pyrolyzable material, the system having a bubbling fluidized bed boiler with electricity production components and a fixed catalyst bed.
Figure 5:
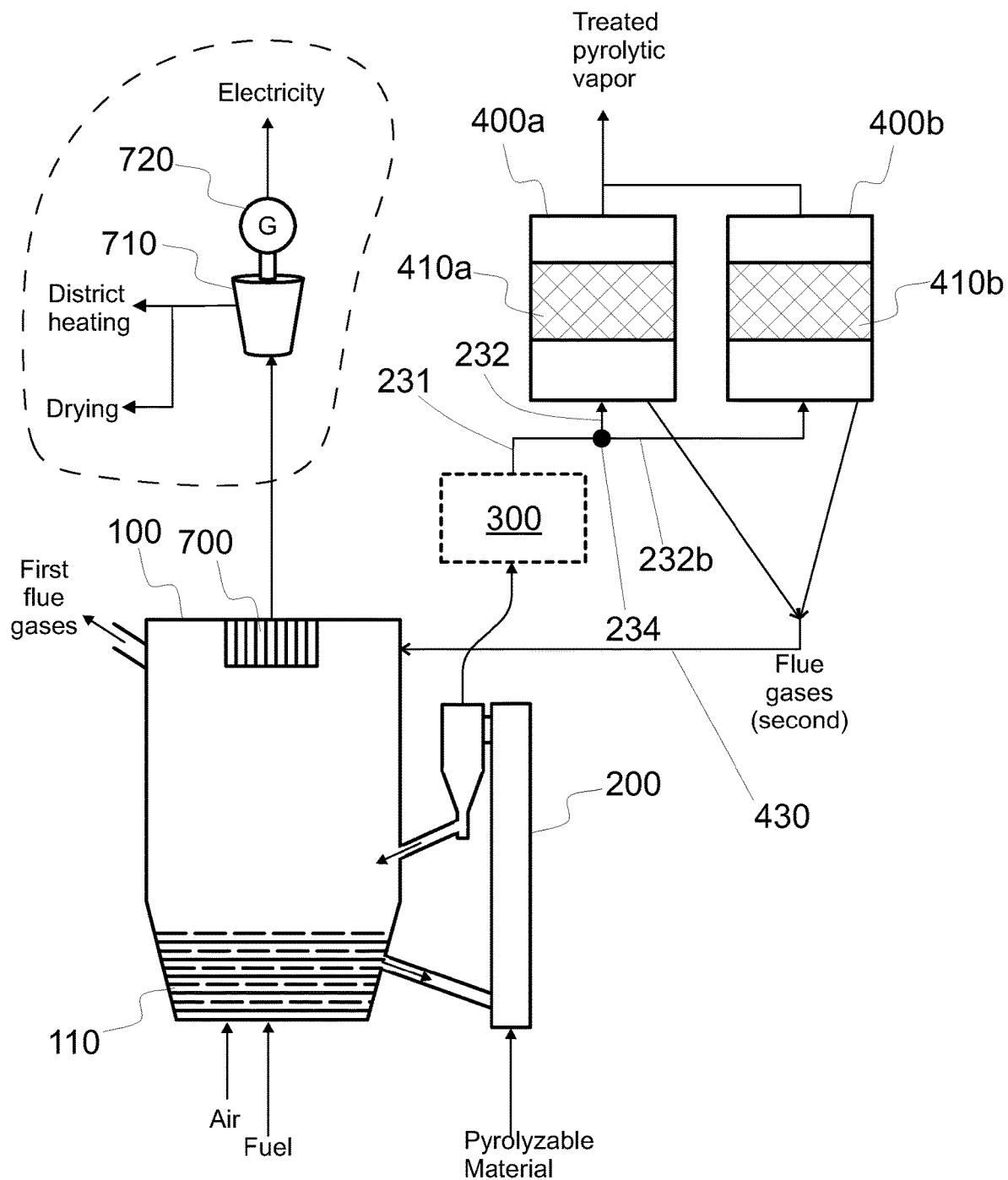
FIG. 5 shows a system configured to produce treated pyrolytic vapor product from pyrolyzable material, the system having a bubbling fluidized bed boiler with heat recovery components and two fixed catalyst beds.

FIGS. 1-8 show a fluidized catalyst bed (FIGS. 1, 2, 7, and 8), a stationary catalyst bed (FIGS. 3, 4, and 6) or two stationary catalysts beds (FIG. 5). These are only shown as examples, and any type of catalyst bed may be used in connection with any embodiment.

Figure 1:
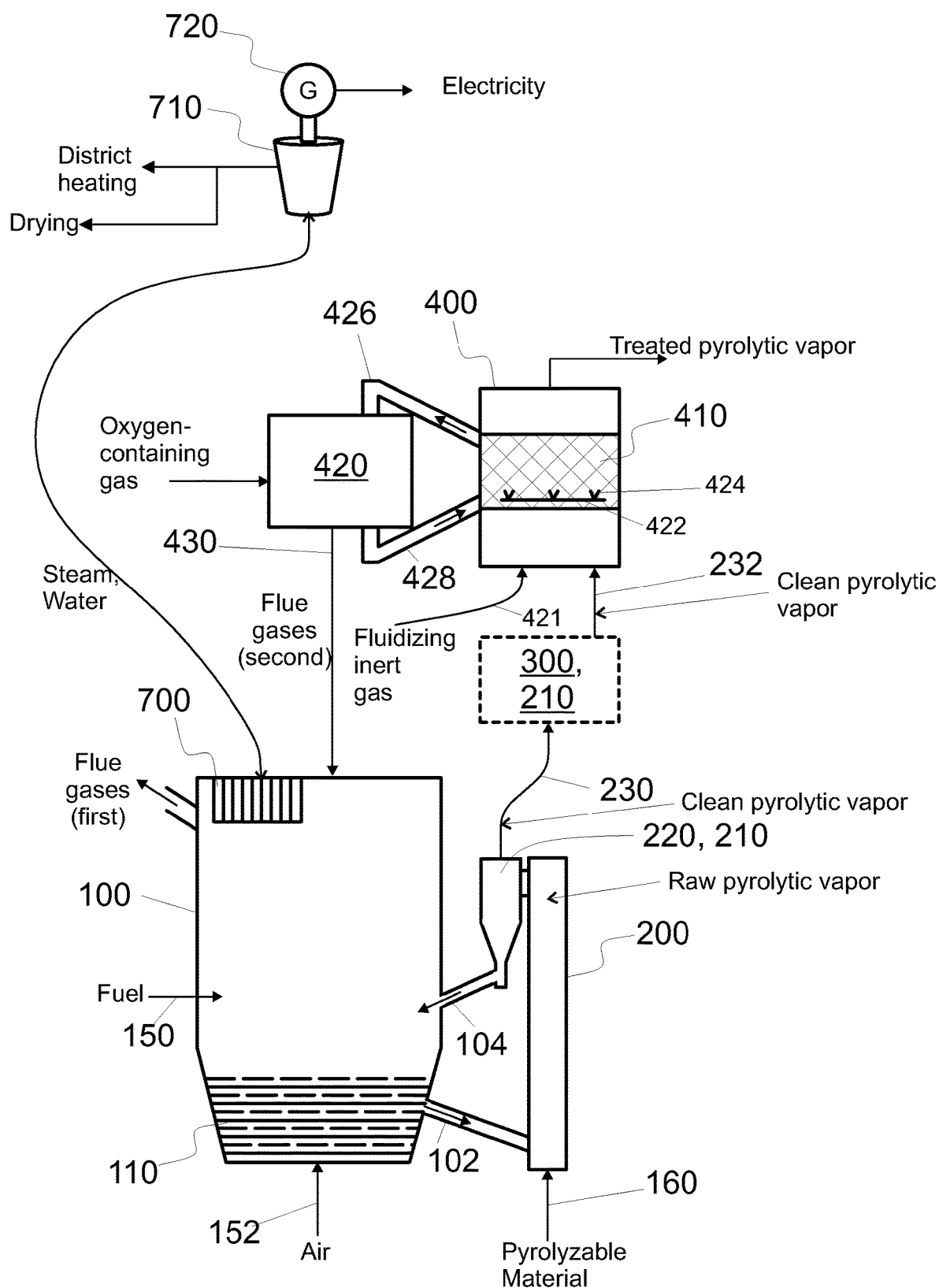
FIG. 1 shows a system configured to produce catalytically treated pyrolytic vapor product from pyrolyzable material, the system having a bubbling fluidized bed boiler and a fluidized catalyst bed.

FIGS. 1-8 show a fluidized bed boiler, such as a circulating fluidized bed boiler (FIG. 2) and a bubbling fluidized bed boiler (FIG. 1). These are only shown as examples, and any type of a fluidized bed boiler may be used in connection with any embodiment. Optionally, a char burner (FIG. 500) may be used in connection with any type of a fluidized bed boiler.

In this description, pyrolyzable material refers to material that comprises carbon. Preferably, pyrolyzable material comprises at least 25 w % (percentage by weight) carbon. Preferably, pyrolyzable material comprises at least 40 w % carbon in terms of dry mass. Pyrolyzable material may comprise or consist of biomass. Pyrolyzable material may comprise polymer materials, e.g. plastics. Pyrolyzable material may comprise or consist of residue-derived material, such as refuse-derived fuel (RDF) and/or solid recovered fuel (SRF). In general, SRF is a special type of RDF, and SRF has a standardized quality.

Biomass may typically comprise virgin and waste materials of plant, animal and/or fish origin or microbiological origin, such as virgin wood, wood residues, forest residues, waste, municipal waste, industrial waste or by-products, agricultural waste or by-products, residues or by-products of the wood-processing industry, waste or by-products of the food industry, solid or semi-solid organic residues of anaerobic or aerobic digestion, such as residues from bio-gas production from lignocellulosic and/or municipal waste material, residues from bio-ethanol production process, and any combinations thereof.

Suitably said biomass comprises waste and by-products of the wood-processing industry such as slash, urban wood waste, lumber waste, wood chips, wood waste, sawdust, straw, firewood, wood materials, paper, by-products of the papermaking or timber processes, where the biomass (plant biomass) is composed of cellulose and hemicellulose, and lignin.

In addition or alternatively, pyrolyzable material may comprise solid waste that comprises carbon. The solid waste may be shredded and/or dehydrated, as known from processing of waste to residue derived fuel (RDF). The pyrolyzable material may comprise RDF. The pyrolyzable material may comprise municipal waste such as plastics and/or biodegradable waste. Non-pyrolyzable materials, which typically are also non-combustible materials, such as glass and metals may be removed from the waste feedstock before pyrolysis. Mechanical separation can be used for the purpose.

Referring to FIG. 1, a fluidized bed boiler 100 is integrated with the pyrolysis reactor 200. This has at least three effects. First, the boiler 100 is by its nature used to recover heat from hot gases. Therefore, the heat of the side products of the process and/or the reaction heat (i.e. chemical energy) of the side products of the process can be recovered by a heat exchanges 700 of the boiler 100. Second, the boiler 100 is by its nature used to produce heat, and optionally also electricity, from fuel, such as biomass or RDF. Therefore, the use of fuel, on one hand for producing the pyrolytic vapor product, and on the other hand for energy and/or heat, can be optimized based on need. Third, in particular fluidized bed serves as an efficient heat source for fast pyrolysis, as the particulate material of a fluidized bed can be used to transfer heat into the pyrolysis reactor 200, optionally via a catalyst material, as will be detailed later. Moreover, because the bed material is solid and particulate, it can be intermixed with pyrolyzable material to facilitate fast pyrolysis in the pyrolysis reactor 200. In an embodiment and when used, also the pyrolysis reactor 200 comprises a fluidized bed including the particulate material and the pyrolyzable material. Such a pyrolysis reactor 200 comprises means, such as nozzles, configured to feed inert gas into the reactor thereby fluidizing the particulate material in the pyrolysis reactor 200.

Figure 2:
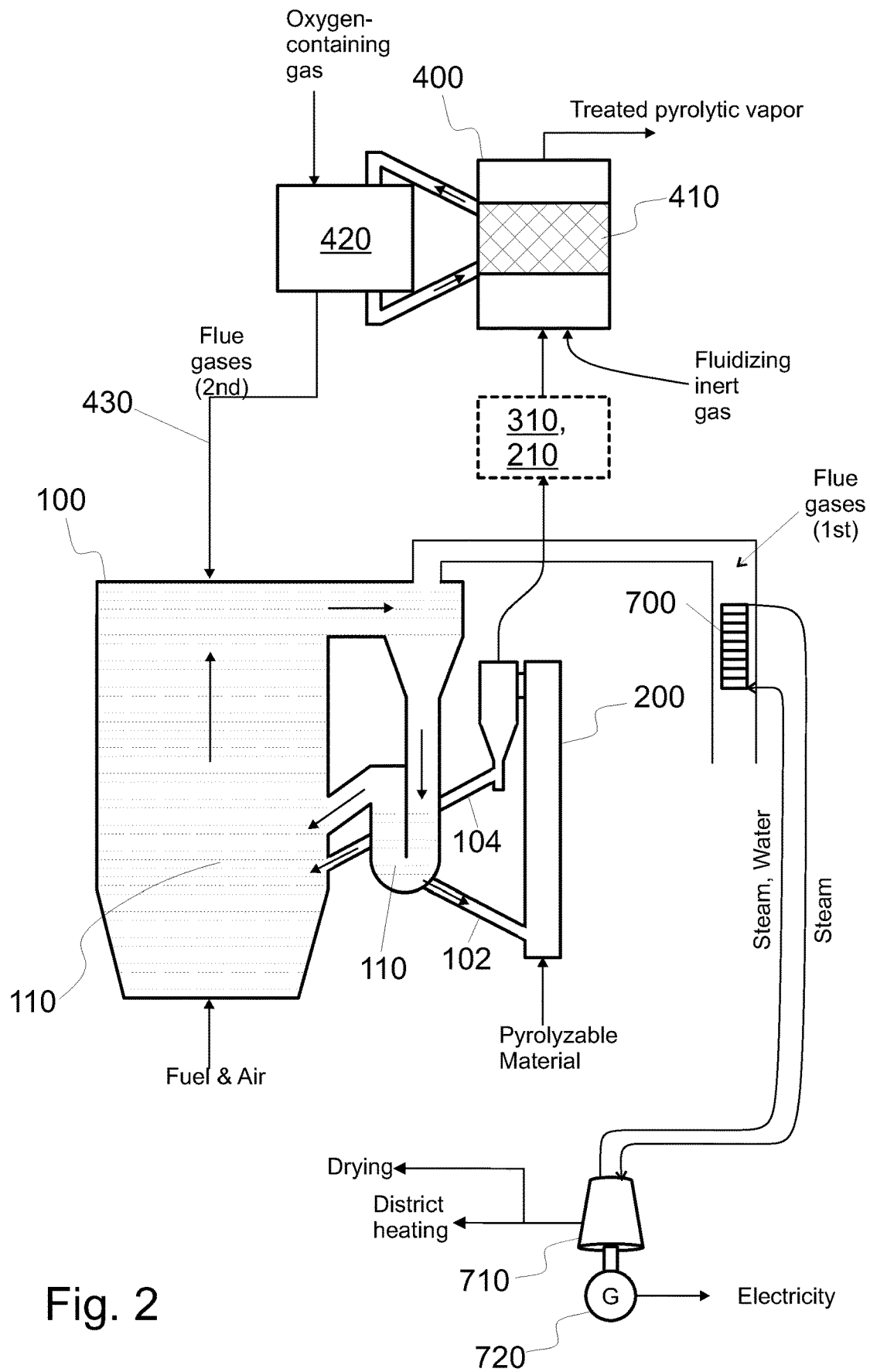
FIG. 2 shows a system configured to produce treated pyrolytic vapor product from pyrolyzable material, the system having a circulating fluidized bed boiler and a fluidized catalyst bed.

A fluidized bed boiler 100 may be a bubbling fluidized bed boiler (BFB boiler), as shown in FIG. 1, or a circulating fluidized bed boiler (CFB boiler), as shown in FIG. 2. When operational, the fluidized bed boiler 100 comprises a fluidized bed 110. Thus, when operational, the fluidized bed 110 of the boiler 100 comprises heat resistant (i.e. incombustible) solid particulate material as bed material. This heat resistant particulate material will be called first heat resistant particulate material whenever considered necessary. For example sand may be used as the heat resistant solid particulate material. When used in connection with a pyrolysis reactor 200, the heat resistant particulate material of the fluidized bed of the fluidized bed boiler preferably comprises at least one of sand, limestone, kaolin, and alumina.

Moreover, some fuel is burned inside the boiler 100 to heat the heat resistant solid particulate material. Therefore, fuel and air are fed to the boiler 100, as depicted in FIGS. 1 and 2. In particular, the fuel, such as biomass and/or RDF, is burned and being mixed with the bed material, such as sand. Preferably, the fuel comprises biomass, such as biomass comprising cellulose.

When fuel is burned, some flue gas (i.e. first flue gas) is produced. The fluidized bed boiler 100 further comprises a heat exchanger 700 configured to recover heat from the first flue gas to a heat transfer medium, such as steam, water, or their mixture. Optionally, and with reference to FIGS. 1, 2, 4, and 5, the heat comprised in steam may be used in a steam turbine 710 in connection with an electricity generator 720 for the production of electricity. The cooled steam, which may comprise water, may be recirculated back to the heat exchanger 700, as depicted in FIGS. 1 and 2. In the alternative, the steam from the steam turbine can be used in other parts of the process, such as for regeneration of catalyst. Optionally, the heat may be used (in addition, as depicted in FIG. 4, or alternatively, as depicted in FIG. 5) for other purposes such district heating and/or drying. In particular, the heat may be used to dry at least one of the received fuel, such as biomass and/or RDF,
the pyrolyzable material, and
the material that is received for use as fuel and the pyrolyzable material (see FIG. 3).

Figure 8:
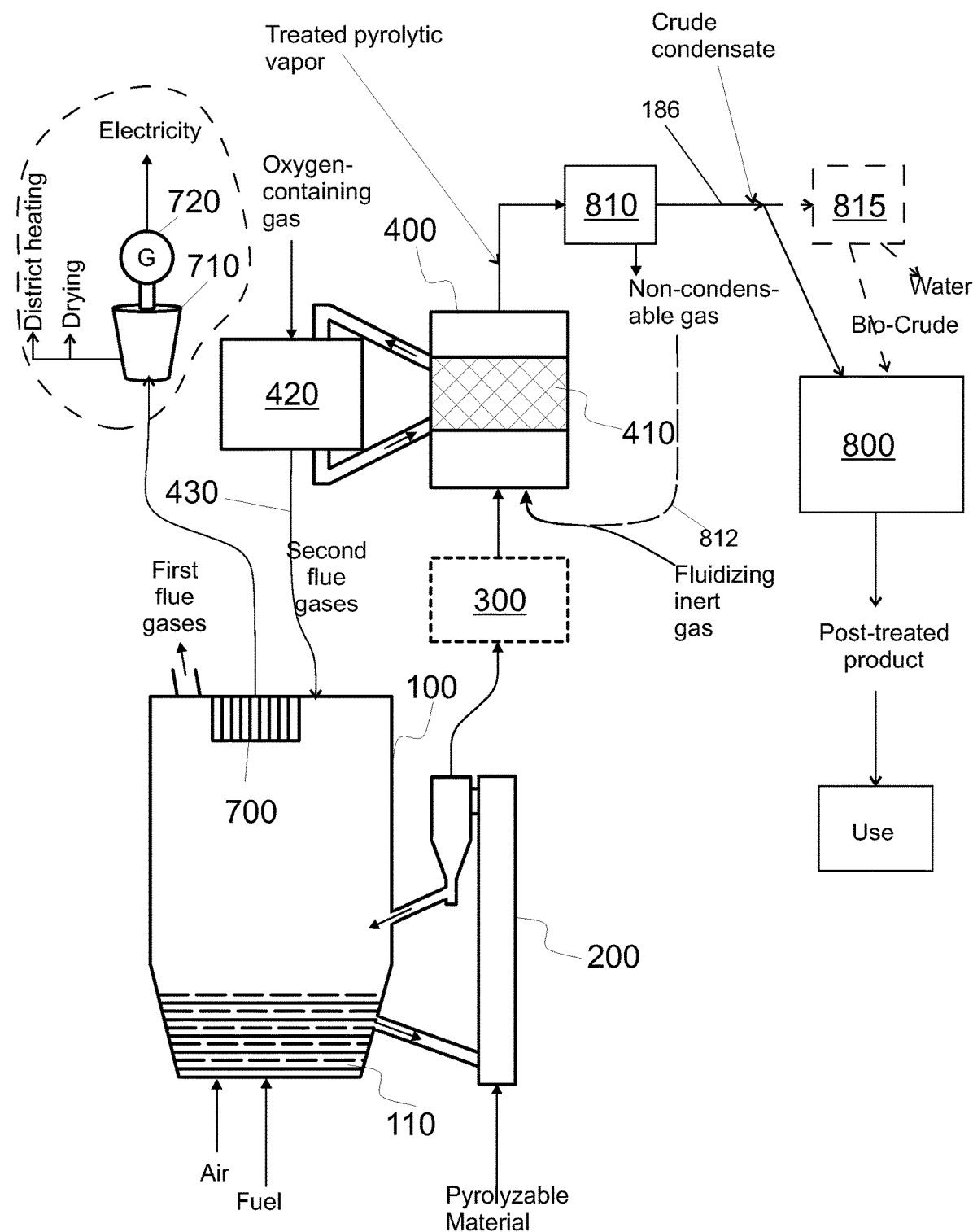
FIG. 8 shows the pyrolysis part of the system of FIG. 1 and means for post treating the catalytically treated pyrolytic vapors.

Even if the production of electricity and/or heat is shown only in some of the figures, electricity and/or heat can be produced in a similar way also in other embodiments. Thus, a dotted line is shown in FIGS. 5 and 8 to emphasize the optionality of these components. Obviously, these components are optional also in some other embodiments. The amount of heat and/or electricity may be selected according to needs.

The atmosphere in the fluidized bed boiler 100 has such a content of free oxygen ($O_2$) that the fuel can be burned. The free oxygen ($O_2$) content in the boiler 100 may be e.g. at least 10 vol % (percentage by volume), at least 15 vol % or at least 20 vol %. Air may be fed to the boiler 110. The free oxygen ($O_2$) content of air is 21 vol %. The fluidized bed boiler may be pressurized or unpressurized.

One idea of the invention is to utilize the energy of the heated particulate material of the fluidized bed boiler 100 as a source of heat for a fast pyrolysis process in the pyrolysis reactor 200. The first particulate material is heat resistant, i.e. it is not damaged by heat. The first particulate material may be referred to a bed material. Heat can be introduced into the pyrolysis reactor 200 with or via the first particulate material. Referring to FIGS. 1 and 2, the arrow shown in the channel 102 indicates transfer of heated bed material from the fluidized bed boiler 100 into the pyrolysis reactor 200, i.e. a pyrolyzer 200. The system comprises a channel 102 or channels for conveying hot particulate material i.e. bed material from the fluidized bed boiler 100 to the pyrolysis reactor 200 directly or indirectly. As discussed above, the particulate material may be conveyed directly, and as will be discussed below, the particulate material may be conveyed indirectly, such as via a char burner 500 (see FIG. 3).

Moreover, a heat exchanger 103 can be used in such a way that none of the first particulate material is transferred to the pyrolysis reactor 200.

In the embodiments of FIGS. 1 and 2, after the bed material has handed over its heat to the pyrolyzable material in the pyrolysis reactor 200, at least some of the bed material is conveyed back to the furnace of the fluidized bed boiler 100 via the channel 104 to be re-heated; as indicated in FIG. 1. Along with the bed material some char will be conveyed from the pyrolysis reactor 200 to the fluidized bed boiler 100 to be burned therein, whereby the heat produced by the burning can also be recovered.

In an embodiment, the temperature of the hot particulate material that is conveyed from the boiler 100 to the pyrolysis reactor 200 or to the heat exchanger 103 is from 550° C. to 900° C. In an embodiment, the particulate material can be cooled before introduced into the pyrolysis reactor using another heat exchanger. Heat may be exchanged e.g. with the returning particulate material (see channel 104), since after pyrolysis, the returning particulate material is typically cooler. In an embodiment, the temperature of the particulate material that is conveyed from the pyrolysis reactor 200 or from the heat exchanger 103 to the boiler 100 is from 300° C. to 600° C. These temperatures have been found to produce such pyrolytic vapors that are suitable for catalytic treatment. In an embodiment, the temperature of the particulate material that is conveyed from the pyrolysis reactor 200 is less than the temperature of the hot particulate material that is conveyed to the pyrolysis reactor 200. The first particulate material is transferred in such a way, that the temperature of the hot first particulate material remains above 400° C. throughout said transferring.

In addition to hot first or second particulate material, pyrolyzable material is fed into the pyrolysis reactor 200. In the pyrolysis reactor 200, the pyrolyzable material becomes heated, whereby the pyrolyzable material is pyrolyzed. In pyrolysis, the pyrolyzable material is heated to a temperature from 400° C. to 700° C. In an embodiment, the pyrolysis reactor 200 is unpressurized, whereby pyrolysis occurs in a substantially atmospheric pressure. As a result of pyrolysis, raw pyrolytic vapors are produced; and some char is produced as a side product. Some of the char may be separated from the raw pyrolytic gas, e.g. in a cyclone. Thus, some char is returned with first or second particulate material to the boiler 100 (FIG. 1) or a char burner 500 (FIG. 3) and some char flows out of the pyrolysis reactor 200 with pyrolytic vapors. The raw pyrolytic vapors may comprise small solid particles or liquid aerosols, which flow with the other components of the raw pyrolytic gas. Thus, the raw pyrolytic gas may be dirty.

The content of free oxygen ($O_2$) of the atmosphere in the pyrolysis reactor 200 is relatively low to avoid burning of the pyrolyzable material and/or the raw pyrolytic vapors. The environment in the pyrolysis reactor 200 has a free oxygen ($O_2$) content of at most 3 vol %, preferably at most 1 vol % or less than 0.1 vol %. Pyrolysis may take place in the absence of free oxygen ($O_2$). In particular, the free oxygen ($O_2$) content in the pyrolysis reactor 200 is less than the free oxygen ($O_2$) content in the furnace of the fluidized bed boiler 100; e.g. by at least 15 percentage units, wherein the free oxygen ($O_2$) content is measured in vol %.

As a result of pyrolysis, vapors, aerosols, char, and non-condensable gases are formed. Some of the char becomes mixed with the bed material in the pyrolysis reactor 200. The remaining components are comprised by the raw pyrolytic vapor (see FIG. 1). Typically, at the aforementioned pyrolysis temperatures, the char that does not flow with the raw pyrolytic vapor constitutes about 5 w % to 35 w % of the pyrolytic products. The raw pyrolytic vapor typically comprise, consist of, or consists substantially of water vapor, non-condensable gases (such as CO, $CO_2$, $H_2$, $CH_4$), complex mixture of oxygenated condensable hydrocarbon molecules, char, coke, soot, and bed material particles, in addition to aerosols which may comprise e.g. condensed tars. In the raw pyrolytic vapor, the condensable hydrocarbon molecules are typically in oxygenated form. The term oxygenated hydrocarbon refers to compounds comprising hydrogen (H), carbon (C), and oxygen (O) atoms bound to other atoms (of the same or a different element) by chemical bonds. As indicated above, the pyrolytic vapor may comprise also other compounds, such as $H_2O$, CO, and $CO_2$, comprising oxygen atoms bound to other atoms (oxygen or a different element).

The raw pyrolytic vapor may be cleaned with a cleaning arrangement 210, comprising at least one of a cyclone 220, a filter 300, and a guard bed 310. The cleaning arrangement 210 is arranged downstream of the pyrolysis reactor 200 and upstream of a catalytic reactor 400. The cleaning arrangement 210 is a means 210 for removing at least some aerosols and/or solid particles from raw pyrolytic vapors.

In an embodiment, in the pyrolysis reactor 200, e.g. in a cyclone 220 thereof, most solids, such as char and bed material, are separated from the raw pyrolytic vapor. In addition or alternatively, the means 210 for removing at least some aerosols and/or solid particles may comprise a filter 300 to remove at least some aerosols and/or solid particles from said raw pyrolytic vapor. The filter 300 may be a hot vapor filter. In addition or alternatively, the means 210 for removing at least some aerosols and/or solid particles may comprise a bed 310 of particulate material, such as a guard bed 310 or a catalyst bed, whereby at least some of the aerosols and/or solid particles may adhere onto the particles of the bed. In addition or alternatively, the means 210 for removing at least some aerosols and/or solid particles may comprise another cyclone (not shown), arranged after the cyclone 220.

As for the optional hot vapor filtering (HVF), the pyrolytic vapor, having been cleaned with a cyclone 220, may be conveyed also through a HVF unit 300 to further clean it, as shown in FIG. 1. Therein, the optional HVF filtering unit 300 is shown by a dash line. Moreover, the HVF unit 300 may be seen as part of the means 210 for removing at least some aerosols and/or solid particles from the raw pyrolytic vapour, the means 210 in FIG. 1 also comprising the cyclone 220. Still further, raw pyrolytic vapor may be conveyed only through a HVF unit 300, provided that a cyclone 220 is not used. In the HVF unit 300 the pyrolytic vapors are filtered at a filtering temperature. The filtering temperature may be e.g. at least 200° C. or at least 400° C. The filtering temperature may be e.g. at most 700° C., at most 650° C., or at most 550° C. The filtering temperature may be e.g. from $L_i$ to $H_i$, wherein i=1, 2, 3, 4, 5 or 6; $L_1=L_2=L_3=200°$ C., $L_4=L_5=L_6=400°$ C., $H_1=H_4=700°$ C., $H_2=H_5=650°$ C., and $H_3=H_6=550°$ C. The filtering should take place at a temperature, which is so high that condensation of the constituents of the pyrolytic vapors does not take place. This reduces the risk of blocking the filter. The temperature should also be not too high, to avoid unnecessary cracking of the pyrolytic vapor. The temperature in the hot vapor filter unit 300 may be e.g. from 400° C. to 700° C.

The HVF filtering unit 300 comprises filtering elements, such as filter plates, wherein the filtering elements are arranged to arrest at least some solid particles. The filtering elements are heat resistant, in particular they are heat resistant against the aforementioned filtering temperature. Even if not shown in all Figures, evidently the HVF unit 300 can be used in combination with other features.

As for the optional guard bed 310 (see FIG. 2), the clean pyrolytic vapor, having been cleaned with a cyclone 220, may be conveyed also through the guard bed 310 to further clean it, as shown in FIG. 2. A guard bed 310 comprises a bed of inert or substantially inert solid material of large surface area to physically trap impurities. The cleaning in the guard bed should take place at a sufficiently low temperature to avoid unnecessary cracking of the pyrolytic vapor. The temperature in the guard bed may be e.g. from 400° C. to 700° C.

A guard bed 310 can be a moving or fluidized guard bed, in a similar manner to a fluidized catalyst bed 410 of FIG. 1. In the alternative, a guard bed 310 can be a fixed bed, in a similar manner to a fixed catalyst bed 410 (or fixed catalyst beds) of FIG. 3, 4, 5, or 6.

In addition, or in the alternative to a first cyclone 220, subsequent cyclones can be used to further clean the pyrolytic vapors. Moreover, such a subsequent (such as a second or a third) cyclone may comprise guard bed material.

Even if not shown, both a guard bed 310 and a hot vapor filter 300 can be used; optionally in combination with another cyclone. Preferably, at least a cyclone 220 is used to clean raw pyrolytic vapors; i.e. the cleaning arrangement 210 preferably comprises at least a cyclone 220. The cyclone 220 is preferably the first component of the cleaning arrangement 210 in the direction of the flow of the vapors, because it does not need as much maintenance as other cleaning equipment. Also, in case the cleaning arrangement comprises at least two cyclones (220 and another), the cyclones are preferably the first two components of the cleaning arrangement 210 in the direction of the flow of the vapors. Thus, the cleaning arrangement may comprise, in the direction of the flow of the pyrolytic vapors, (i) only the cyclone 220; (ii) the cyclone 220 and the hot vapor filter 300; (iii) the cyclone 220 and the guard bed 310; (iv) the cyclone 220, the hot vapor filter 300, and the guard bed 310; (v) the cyclone 220, the guard bed 310, and the hot vapor filter 300; (vi) the cyclone 220, the other cyclone, and the hot vapor filter 300; (vii) the cyclone 220, the other cyclone, and the guard bed 310; (viii) the cyclone 220, the other cyclone, the hot vapor filter 300, and the guard bed 310; or (ix) the cyclone 220, the other cyclone, the guard bed 310, and the hot vapor filter 300. In addition, guard bed material may be arranged in the other cyclone and/or a further cyclone may be used after the other cyclone and before other components of the cleaning arrangement 210.

After the removal of at least some char and other contaminating particles and/or aerosols from raw pyrolytic vapor by said cleaning, the pyrolytic vapor will be referred to as clean pyrolytic vapor (see FIG. 1). Referring to FIG. 1, the clean pyrolytic vapor is conveyed in the pipes 230 and 232; or in the absence of the filter 300 in a pipe 230. The clean pyrolytic vapor is conveyed into a catalytic reactor 400.

The clean pyrolytic gas comprises oxygenated condensable hydrocarbon molecules, aerosols, and non-condensable gases, in addition to char. The relative amount of char depends e.g. on the degree of cleaning. Typically char constitutes at most 1 w % (percentage by weight) or at most 0.5 w % of the clean pyrolytic gas that is conveyed into the catalytic reactor 400. Thus, in the means 210 for removing at least some aerosols and/or solid particles from raw pyrolytic vapors, the raw pyrolytic gas is preferably cleaned in such a way that at most 1 w % or at most 0.1 w % of the char produced by the pyrolysis is conveyed with clean pyrolytic vapors into the catalytic reactor 400.

By this removal, and because most of the impurities of the pyrolytic vapors stay with the residual char, which is separated in the means 210, the clean pyrolytic vapors comprise less impurities than the raw pyrolytic vapors. Cleaning is beneficial, because char, alkali metals, and other inorganic components of the pyrolytic vapor increase the deactivation ratio of the catalysts of the catalyst bed 410. In general, catalysts are deactivated e.g. because of coke deposition, accumulation of alkaline metals, sintering of the active material (e.g. metal) and support, and accumulation of the product on the catalyst. Thus, the clean pyrolytic vapors can be catalytically treated without the catalyst being degraded by the impurities; or at least the rate of degrading the catalyst is much slower. Moreover, the better the cleaning is done, the longer is the life time of the catalysts in the catalyst reactor 400. Preferably cleaning is performed at least to the aforementioned degree. Also preferably, the means 210 comprises the cyclone 210 and at least one of (i) another cyclone, (ii) the hot vapor filter 300, and (iii) the guard bed 310.

The pyrolyzable material and/or the fuel for the fluidized bed boiler 100 may comprise solid biomass, such as plants and/or pieces of plants. In addition or alternatively, the biomass may comprise oils of biological origin. Preferably, the pyrolyzable material comprises at least 50 w % solid biomass; more preferable at least 90 w % solid biomass. Also preferably, the pyrolyzable material comprises at least 50 dry-w % (percentage by weight of dry solid matter to total dry matter, from which water is removed by drying) solid biomass; more preferable at least 90 dry-w % solid biomass. This has the beneficial effect that the same biomass can be used as the fuel of the boiler 110 and as the pyrolyzable material. The term "solid" here refers to materials that are solid at all temperatures below 70° C. in the atmospheric pressure.

In an embodiment, the pyrolyzable material comprises cellulose. In an embodiment, the pyrolyzable material comprises at least 10 w % cellulose. In an embodiment, the pyrolyzable material comprises wood. In an embodiment, the pyrolyzable material comprises at least 90 w % solids that originate from agriculture (including forestry). In an embodiment, the pyrolyzable material comprises at least 90 w % solids that originate from wood.

The catalyst material of the catalyst bed 410 may be selected according to the quality requirements for the treated pyrolytic vapor. The catalyst material of the catalyst bed 410 may be selected according to the type of biomass used as the pyrolyzable material. In particular, the catalyst of the catalyst bed 410 may be selected for pyrolytic vapors obtainable by pyrolyzing biomass; in such a way that the oxygen content and/or acidity is sufficiently low, as will be discussed below.

The process parameters, such as temperature and/or pressure in the pyrolysis reactor 200 affect the yield and quality of the raw and clean pyrolysis vapor obtained from pyrolysis.

In an embodiment, the temperature in the pyrolysis reactor 200 is from 400° C. to 700° C. In an embodiment, the pressure in the pyrolysis reactor 200 at most 2 bar(a) (absolute pressure in bars), or at most 1.5 bar(a). The process may be unpressurized. In an embodiment, the temperature in the pyrolysis reactor 200 is from 400° C. to 700° C. and the pressure in the pyrolysis reactor 200 is at most 1.5 bar(a). The process may be unpressurized.

The reasonably low pressure of the pyrolysis reactor 200 simplifies the equipment, because high-temperature and high-pressure vessels would require special material selections. In this way, the process can be simplified, compared to a high pressure pyrolysis reactor 200. As simpler process is easier to implement, whereby the availability can be improved and investment costs reduced.

In an embodiment, the pressure in the pyrolysis reactor 200 is greater than or equal to the pressure in the catalyst bed 410, in particular the pressure of the vapors therein. In an embodiment, the temperature in the pyrolysis reactor 200 is from 400° C. to 700° C. and the pressure in the pyrolysis reactor 200 is greater than, substantially equal to, or equal to the pressure in the catalytic reactor 400. Preferably, the pressure in the catalytic reactor 400 is substantially equal to the pressure in the pyrolysis reactor 200. This has the effect that no compressor is needed in between the pyrolysis reactor 200 and the catalytic reactor 400; thereby further simplifying the process. Moreover, preferably the pressure in the boiler 100 is greater than, substantially equal to, or equal to the pressure in the pyrolysis reactor 200. This has the effect that no compressor is needed in between the boiler 100 and the pyrolysis reactor 200.

From the pyrolysis reactor 200 the pyrolytic vapors are conveyed, optionally via the cleaning arrangement 210, to a catalytic reactor 400. In particular, in an embodiment, at least some of the clean pyrolytic vapors are conveyed from the means 210 for separating char from raw pyrolytic vapors, such as the cyclone 220, to the catalytic reactor 400. This has the effect that substantially less char is being conveyed to the catalytic reactor 400, as compared to conveying the raw pyrolytic gas to a catalytic reactor. Impurities could deteriorate the catalyst of the reactor 400.

The clean pyrolytic vapors may be conveyed in a pipeline 230 or pipelines 230, 232 for conveying pyrolytic vapor from the pyrolysis reactor 200 into the catalytic reactor 400. The system may comprise a pipeline 230, 232 for conveying at least some clean pyrolytic vapor from the means 210 for separating char from raw pyrolytic vapors into the catalytic reactor 400.

The catalytic material of the catalyst bed 410 of the catalytic reactor 400 is preferably selected in such a way that the catalytic reactions take place in a low pressure; in particular in a pressure lower than that of the pyrolysis reactor 200. This has two effects. First, the investment costs for the catalytic reactor 400 remain low, as it needs not to withstand high pressure. Second, there is no need for a compressor or a fan to facilitate the flow of the clean pyrolytic vapors from the pyrolysis reactor 200 to the catalytic reactor 400. Preferable catalysts and operating conditions will be discussed below.

The main purpose of the catalyst is to deoxygenate the oxygenated condensable hydrocarbons, which are comprised by the clean pyrolytic vapor. Such deoxygenation reactions deoxygenate at least some of the oxygenated hydrocarbons to hydrocarbons, or at least less oxygenated hydrocarbons. In the reaction, at least some of the oxygen (O) that is bound to oxygenated hydrocarbons is removed from the oxygenated hydrocarbons thereby deoxygenating these hydrocarbons. The removed oxygen forms with other constituents of the pyrolytic vapor other oxygen containing compounds, such as water ($H_2O$), carbon monoxide (CO), and/or carbon dioxide ($CO_2$). Also, some light hydrocarbons and oxygenated hydrocarbons may be formed as a result of the reactions.

To illustrate the importance of utilization of side products, as an example, pyrolysis of dry biomass may produce 20 w % bio-crude and 80 w % side products for example
31 w % water rich fraction,
12 w % char, which is produced in the pyrolysis reactor 200 and is burned in the process,
2 w % coke, which is produced in the catalysis reactor 400, and may burned when the catalyst is regenerated and/or thereafter, and
35 w % non-condensable gases.

All figures are given in weight percent relative to mass of dry biomass.

The resource efficiency of the process can be increased when the side products are utilized. These side products contain heat and/or reaction heat, which may be recovered and utilized in the process. Still further, the heat of the treated pyrolytic product itself may be utilized.

Examples of utilization of side products and heat include:
conveying the water fraction from a separator 815 (see FIGS. 7 and 8) to the boiler 100 to utilize the chemical energy of the constituents of the water fraction,
recovering heat from a condenser 810 configured to condense treated pyrolytic vapor (FIG. 7), including
recovering heat of the treated pyrolytic vapor product and
recovering heat of the non-condensable gas intermixed with the pyrolytic vapor product,
conveying non-condensable gases from a condenser 810 configured to condense treated pyrolytic vapor back to the process,
regenerating the catalyst and conveying the second flue gas thus formed back to the process,
conveying the char from the pyrolysis reactor 200 to the boiler 100 (see e.g. FIG. 8) to be burned, and utilizing the heat obtained by burning the char,
conveying the char from the pyrolysis reactor 200 to a char burner 500 (see e.g. FIG. 3) to be burned, and utilizing the heat obtained by burning the char, e.g. by the heat exchangers of the boiler 100 (cf. the fourth flue gas),
conveying other side products from the post-treatment 800 back to the process,
recovering heat from post treatment 800 and utilizing the heat, and
recovering heat from pyrolysis reactor 200 (FIG. 3) and utilizing the heat.

Even if not shown in all figures, any such utilization is preferable in each such embodiment wherein it is possible.

In this description, the oxygen content of the pyrolytic vapor may refer to the total weight of such oxygen atoms that are bonded in condensable compound(s) comprising at least carbon, oxygen, and hydrogen in relation to the total weight of such condensable compounds of the pyrolytic vapor that comprise carbon and hydrogen (e.g. hydrocarbons and oxygenated hydrocarbons). A condensable substance will be in condensed form (i.e. liquid) in atmospheric pressure at a temperature of 60° C. to 25° C.; such as at 60° C. or at 25° C. Thus, this oxygen content is measured in w % (dry basis). Typically, the oxygen content of the clean pyrolytic vapors on dry basis is from 30 w % to 50 w %. Conversely, a non-condensable gas is gas that is not a condensable substance the above sense.

Figure 7:
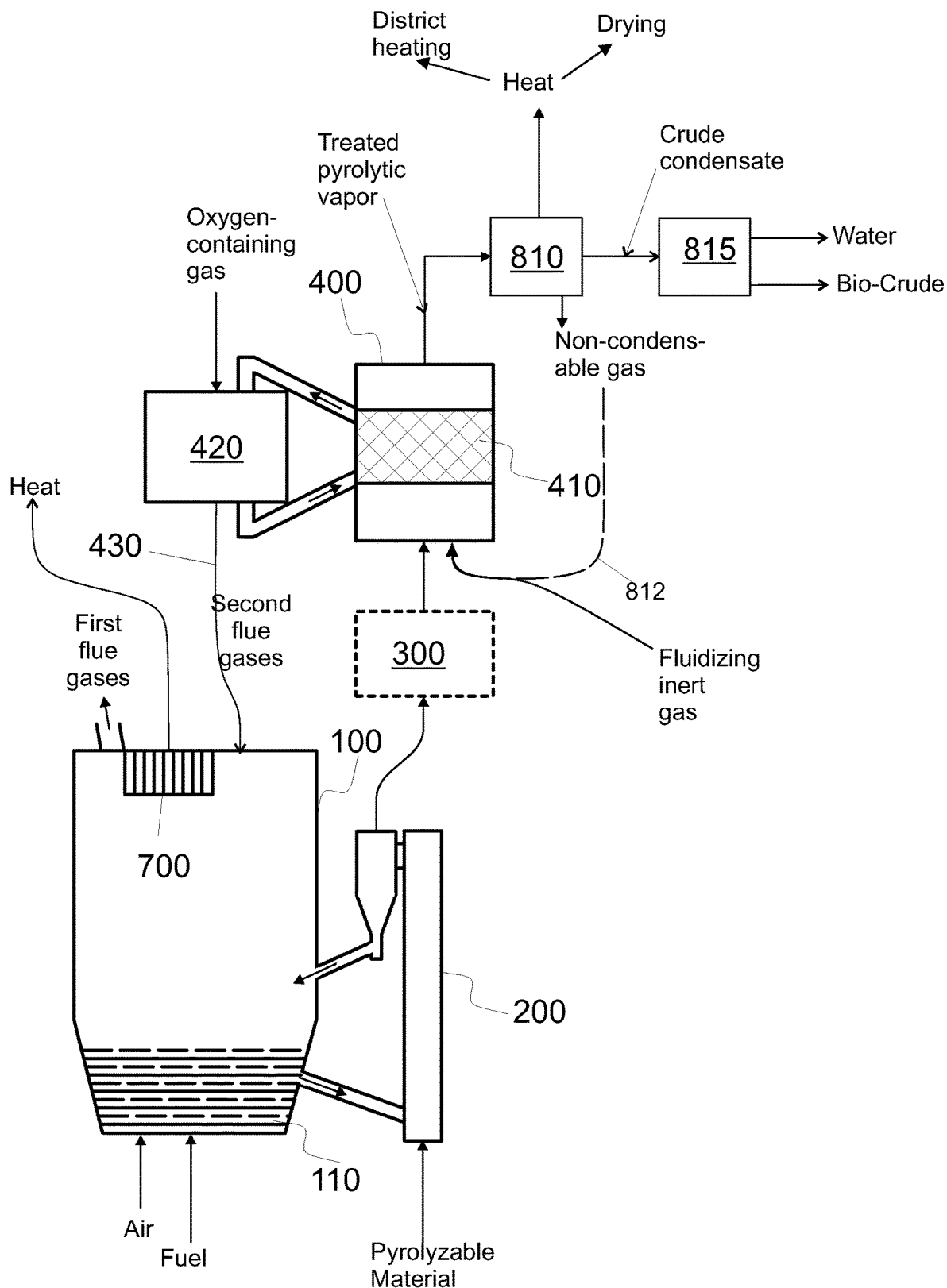
FIG. 7 shows the pyrolysis part of the system of FIG. 1 and means for condensing and drying the catalytically treated pyrolytic vapor.

In this description, the oxygen content of the pyrolytic vapor may refer to the total weight of such oxygen atoms of bio-crude or raw bio-crude that are bonded in compounds comprising at least carbon, oxygen, and hydrogen in relation to the total weight of the bio-crude or raw bio-crude, respectively. Bio-crude, on the other hand is obtainable from the catalytically treated pyrolytic vapor as a remainder after condensation and separation of water rich fraction. The condensation may take place at a temperature that is at most 60° C. such as at most 25° C., as indicated above (see the word "condensable"). The condensation temperature may be at least 5° C. The condensing and separation are shown in FIG. 7. For determining the efficiency of the catalytic treatment, the raw pyrolytic vapor, before catalytic treatment, may be condensed (in the aforementioned temperature and pressure) and water rich fraction may be separated therefrom to obtain a first oxygen content for the un-treated pyrolytic vapor; and the treated pyrolytic vapor, after catalytic treatment, may be condensed (in the aforementioned temperature and pressure) and water rich fraction may be separated therefrom to obtain a second oxygen content for the treated pyrolytic vapor. The remainder after condensation and separation of water rich fraction may be called raw bio-crude (when applied to untreated pyrolytic vapors) and bio-crude (when applied to catalytically treated pyrolytic vapors, see FIG. 7).

Because of the deoxygenation reactions, the oxygen content (see either definition above) of the treated pyrolytic vapor is lower than the oxygen content of the un-treated (i.e. raw or clean) pyrolytic vapor (see FIG. 1). The oxygen content of the treated pyrolytic vapor may be lower than the oxygen content of the un-treated (i.e. raw or clean) pyrolytic vapor by at least 15 percentage units or by at least 25 percentage units, when the oxygen content is measure in w %.

Moreover, in an embodiment, the raw or clean pyrolytic vapor is catalytically treated in such a way that the total acid number (TAN) of a composition, that is obtained from the treated pyrolytic vapor as a remainder after condensation and separation of water rich fraction, is between 0 and 50. For further details of TAN, we refer to the standard ASTM D664-81. The composition having such TAN is denoted by "bio-crude" in FIG. 7. The condensation may take place at a temperature that is at most 60° C. such as at most 25° C., as indicated above (see the word "condensable"). The condensation temperature may be at least 5° C. The pressure for condensation for this definition is atmospheric (101 kPa).

In the catalytic reactor 400, at least some of the pyrolytic vapor (raw or clean) in the vapor form is conveyed through a catalyst bed 410 comprising catalyst material. In an embodiment a catalyst bed 410 comprising catalyst material is arranged inside a catalytic reactor 400 in such a way that at least some of the clean pyrolytic vapor is arranged to flow through the catalyst bed 410 inside the catalytic reactor 400.

By conveying pyrolytic vapor in the vapor form through the catalyst bed 410, the catalyst in the bed 410 catalyses such chemical reactions in the pyrolytic vapor that improve the properties of the pyrolytic vapors. In this way, the catalytic treatment increases the quality pyrolytic vapors. It has been found that the quality of the pyrolytic vapors are effected by at least one, most likely all, of
the catalyst material used,
the temperature of the catalyst bed,
the pressure in the catalyst bed, and
the composition of the pyrolyzable material.

The catalyst material may be selected in such a way that it effectively improves the properties of pyrolytic vapor obtainable from the pyrolyzable material used. Preferable types of pyrolyzable materials were discussed above. The catalyst material may be selected in such a way that it effectively improves the quality of pyrolytic vapor obtainable from pyrolyzable material in a fast pyrolysis process, wherein the pyrolyzable material is heated by contacting it with first or second particulate material. The catalyst material may be selected in such a way that it effectively improves to properties of pyrolytic vapor obtainable from biomass, e.g. biomass from agricultural origin.

Therefore, the catalyst material preferably has a deoxygenating functionality. This catalyst material may be selected from a group of catalysts having at least one, preferably all, of dehydration, condensation, cracking, deoxygenation, decarboxylation, decarbonylation, depolymerization, and dearomization functionalities. Preferably the catalyst material is selected from a group of catalysts having at least one, more preferably all, of condensation, decarbonylation, and decarboxylation functionalities. Preferably the catalyst material is a multifunctional catalyst.

The catalyst may be selected from naturally occurring zeolites, synthetic zeolites and combinations thereof. The catalyst may be a ZSM-5 zeolite catalyst. Other zeolite catalysts that may be used may include ferrierite, zeolite Y, zeolite beta, mordenite, MCM-22, ZSM-23, ZSM-57, SUZ-4, EU-1, ZSM-11, (S)AlPO-31, SSZ-23, and the like. Non-zeolite catalysts may also be used; for example, $WO_x/ZrO_2$ and aluminum phosphates. The catalyst may comprise a metal and/or a metal oxide. Suitable metals and/or oxides may include, for example, nickel, palladium, platinum, titanium, vanadium, chromium, manganese, iron, cobalt, zinc, copper, gallium, and/or any of their oxides, among others. In some cases promoter elements selected from the rare earth elements, i.e. elements 57-71, cerium, zirconium or their oxides, or combinations of these may be included to modify the activity, structure and/or stability of the catalyst. In addition, in some cases, properties of the catalysts (e.g., pore structure, type and/or number of acid sites, etc.) may be chosen to selectively produce a desired product.

In addition, or alternatively, a metal oxide catalyst that includes oxides of at least one metal from Group 2, Group 3 (including Lanthanides and Actinides), or Group 4 of the Periodic Table of Elements (New IUPAC Notation), can be used. The metal oxide catalyst can also include more than one oxide of different metal components. Group 2 metals that can be included as an oxide component in the catalyst are beryllium, magnesium, calcium, strontium, barium, radium, and combinations thereof. Examples of preferred oxides containing at least one Group 2 metal include, but are not limited to, one or more of magnesium oxides, calcium oxides, and hydrotalcite $(Mg_6Al_2(CO_3)(OH)_{16}.4H_2O)$, which can be calcined to form a basic magnesium aluminum oxide catalyst, representing a Group 2 metal oxide catalyst. Group 3 metals (including Lanthanides and Actinides) that are naturally occurring and can be included as an oxide component in the catalyst are scandium, yttrium, lanthanum, actinium, cerium, praseodymium, neodymium, samarium, europium, gadolinium, terbium, dysprosium, holmium, erbium, thulium, ytterbium, lutetium, thorium, protactinium, and uranium. Examples of preferred Group 3 metals include, but are not limited to, yttrium, cerium, praseodymium, and combinations thereof. Group 4 metals that can be included as an oxide component in the catalyst are titanium, zirconium, and hafnium. One example of a preferred Group 4 metal includes zirconium.

In an embodiment, the catalyst comprises a zeolite having a hierarchical pore structure ranging from 5 to 20 angstrom pore size, a non-zeolitic matrix with a hierarchical pore structure ranging from about 100 to about 5,000 angstrom pore size, and a binder. The matrix may comprise a clay or clay mixture. In some embodiments, the matrix comprises silica, alumina, a silica-alumina, transitional metal oxide or combination thereof. The transitional metal oxide can be titanium dioxide or zirconium dioxide. The binder may be a silica, a phosphate, or ammonium polysilicate In an embodiment, the temperature of the catalyst bed 410 is from 400° C. to 700° C. The reactions in the catalytic reactor may increase the temperature of the pyrolytic vapors. In an embodiment, the pressure of the vapors in the catalyst bed 410 is less than or equal to the pressure of the vapors in the pyrolysis reactor 200. In an embodiment, the pressure of the vapors in the catalyst bed 410 is less than 2 bar(a). In an embodiment, the pressure of the vapors in the catalyst bed 410 is less than 1.5 bar(a).

In an embodiment, the temperature of the catalyst bed is from 400° C. to 700° C. and the pressure in the catalyst bed 410 is less than or equal to the pressure in the pyrolysis reactor 200. Herein the pressure refers to that of the vapors in the catalytic reactor 400 or the pyrolysis reactor 200.

In an embodiment, the temperature of the catalyst bed is from 400° C. to 700° C., the pressure in the catalyst bed 410 is less than or equal to the pressure in the pyrolysis reactor 200, and the temperature in the pyrolysis reactor 200 is from 400° C. to 700° C. Herein the pressure refers to that of the vapors in the catalytic reactor or the pyrolysis reactor.

To decrease the costs of use, the catalyst may be selected in such a way that the catalyst is effective also in the absence of hydrogen ($H_2$) or in the presence of only small amounts of hydrogen ($H_2$); in contrast to some catalyst that function only in the presence of a substantial amount of hydrogen. Some of the aforementioned catalysts are effective also for low amounts of hydrogen. In an embodiment, the partial pressure of hydrogen of the vapors in the catalyst bed 410 is less than 0.5 bar, less than 0.4 bar, or less than 0.2 bar.

As indicated above, the aforementioned catalysts work without the addition of external hydrogen into the process before or into the catalytic reactor 400. Thus, in an embodiment, no external hydrogen ($H_2$) is fed to the process in between the pyrolysis reactor 200 and the catalyst bed 410 or into the catalyst bed 410. This also improves the efficient use of raw materials, since hydrogen is reasonably expensive and hard to handle safely, which implies increased investments costs.

In this way at least some of the pyrolytic vapor is catalytically treated and some treated pyrolytic vapor is produced. In this way, heat is efficiently produced and used, and high quality pyrolytic vapor product is produced. The treated pyrolytic vapor can be seen as a product of the process. Moreover, the treated pyrolytic vapor can be condensed, and a water-rich fraction may be separated after such condensing (see FIG. 7).

In an embodiment the same type of feedstock, e.g. biomass, is used as fuel for the fluidized bed boiler 100 and as the pyrolyzable material for the pyrolysis reactor 200 (see FIG. 3). Correspondingly, therein feedstock material is received with means 170. The received feedstock is divided, with suitable means 172, to said fuel and said pyrolyzable material. Fuel is fed to the fluidized bed boiler 100 with suitable means 152 and pyrolyzable material is fed to the pyrolysis reactor 200 with the means 160. By varying the ratio of fuel to feedstock material one can control the output of the process: how much of the feedstock is used for the production of heat and/or energy and how much is used for the production of the treated pyrolytic product. It is clear that such a division can be used in combination with other features.

In connection with a fluidized catalyst bed 410 (see FIGS. 1 and 2) or a bubbling catalyst bed, a regenerator 420 may be used to regenerate the catalyst while the catalyst reactor 400 is used. However, a fixed catalyst bed cannot be regenerated at the same time it is used for catalytic treatment of pyrolytic vapors. If only one fixed catalyst bed is used (see FIG. 3 or 4), the production of pyrolytic vapors must be stopped during regeneration of the catalyst. However, the production of electricity, heat or untreated pyrolysis oil can continue during regeneration if the fixed catalyst bed is bypassed. This minimizes the downtime of the process and thus increases availability and production of usable products increasing the efficiency of the process. When at least two fixed catalyst beds 410a, 410b are used (see FIG. 5), one of the beds 410a, 410b may be used, while the catalyst of the other (410b, 410a, respectively) is being regenerated. FIG. 5 shows an embodiment, wherein the catalyst of each such catalytic reactor 400, 400b that is not used to treat pyrolytic vapor is regenerated in the catalytic reactor itself by feeding sufficient amounts of oxygen therein (compare to FIG. 4). As is evident, at another time that same reactor 400, 400b can be used for catalytic treatment. In the alternative the two catalytic reactors 400a, 400b could share a common regenerator 420, wherein the catalyst could be regenerated. In the alternative, each catalytic reactor 400, 400b may have its own regenerator 420 (not shown). Also these options can be freely chosen for any type of fluidized bed boiler, for any type of upgrading unit, irrespective of the presence or content of the cleaning arrangement 210, and irrespective of the process environments in the pyrolytic reactor 200 or in the catalytic reactor 400.

Regeneration can be used to recover the activity of the catalyst, when deactivation has occurred due to reversible deactivation reactions, such as coke deposition and/or accumulation of the product. Conversely, regeneration does not re-activate catalysts for the part they have been deactivated by irreversible processes, such as accumulation of other impurities than char. Therefore, in addition to regeneration, some of the catalyst can be replaced by adding some makeup catalyst, thereby enabling to keep the optimized activity level of the catalyst. Such makeup catalyst may be fed into the process or system, e.g. to a regenerator 420 or a catalytic reactor 400, 400a, 400b.

In the regeneration of the catalyst, some second flue gas, comprising at least some carbon oxides (CO and/or $CO_2$), is formed. Such second flue gas may be conveyed to the fluidized bed boiler 100, e.g. to the furnace thereof. Thus, the heat of the flue gases from the regeneration can be recovered with the heat exchangers 700 of the boiler. This is illustrated in FIGS. 1, 2, 4, and 5. The corresponding system comprises means, such as a pipeline, configured to convey flue gas from the regenerator 420 or the catalyst reactor 400 into the fluidized bed boiler 100.

Depending on the needs, catalyst of the bed 410 may be regenerated in the presence of free oxygen ($O_2$) and steam ($H_2O$). The free oxygen may be comprised by air. In that case, in addition to carbon oxides, also at least some of some of free hydrogen ($H_2$), methane ($CH_4$), and light hydrocarbons would be produced. The constituents comprising at least (bound) hydrogen (H) could also be utilized in other process steps. As indicated above, also in this case, the temperature at which the catalyst is regenerated is preferably at most 1000° C.; preferably alternative or in addition at least 400° C. The pressure in the regeneration is typically atmospheric, such as from 0.5 bar(a) to 1.5 bar(a). Steam for the regeneration can be generated e.g. from the water rich phase of the treated pyrolytic vapor; see FIG. 7, "water". Alternatively or in addition, steam can be taken from the steam cycle of the power plant, e.g. as the low pressure steam after the steam turbine 710.

In addition to regeneration, catalyst material of the catalyst bed 410 can be stripped. Stripping can be done to clean the catalyst material from vapors, liquids, and/or aerosols that have been trapped to within and on the catalyst structure, which often is a porous structure. Stripping can be performed in a separate stripping unit (not shown). Steam and/or hydrogen can be fed to the stripping unit to strip the catalyst. Conditions in the stripping unit are selected according to the catalyst.

Referring specifically to FIG. 1, in an embodiment the catalytic reactor 400 comprises a fluidized catalyst bed 410. In the fluidized catalyst bed, the catalyst material forms the fluidized catalyst bed. The fluidized catalyst bed is formed by arranging the catalyst onto a grate 422 and feeding fluidizing inert gas (e.g. through nozzles 424) towards the catalyst. The fluidizing inert gas is fed in such a way that the inert gas flow is guided upwards, whereby the flow of the inert gas fluidizes the catalyst. In this embodiment, the system comprises means 421 for feeding fluidizing inert gas into the catalytic reactor and means (such as grate 422 and nozzles 424) for fluidizing the catalyst material. As indicated in FIG. 1, the pyrolytic vapor may flow in the same direction as the fluidizing inert gas. However, the pyrolytic vapor may alternatively flow in a reverse direction (i.e. downwards), or in any other direction, such as in a horizontal direction through a fluidized catalyst bed. The fluidized catalyst bed may be a circulating fluidized bed or a bubbling fluidized bed. As an alternative to a fluidized catalyst bed, a moving catalyst bed can be used.

Figure 9:
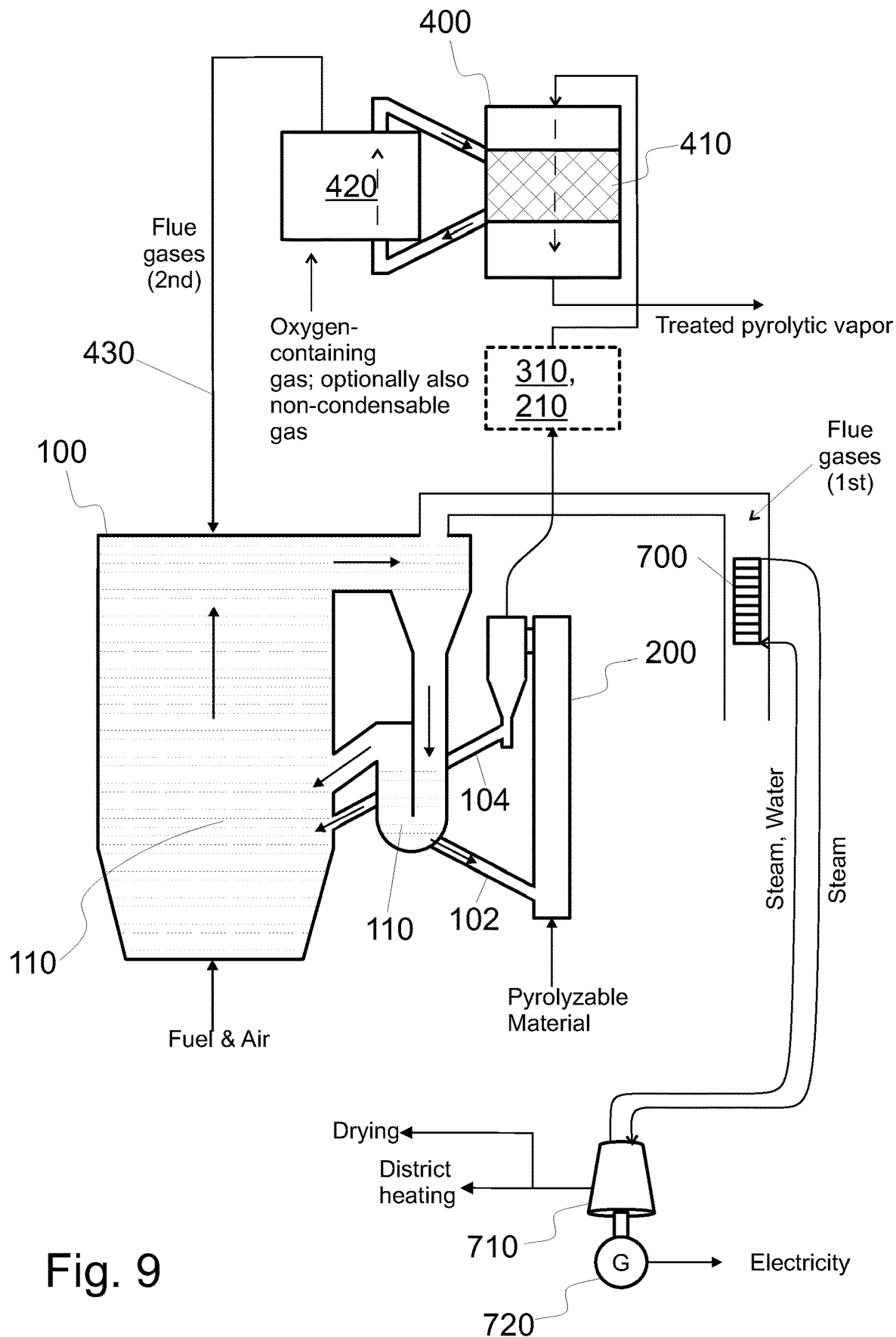
FIG. 9 shows a system configured to produce treated pyrolytic vapor product from pyrolyzable material, the system having a downer type catalyst reactor and a riser type regenerator.

As an example, FIG. 9 shows an embodiment, wherein the pyrolytic vapors flow downwards through the catalyst bed 410 in the catalytic reactor 400. In addition, the catalyst of the bed 410 gradually moves downwards in the catalytic reactor 400. In this way, the pyrolytic vapor and the catalyst flow concurrently in the catalytic reactor 400. Sufficient mixing of catalyst and the pyrolytic vapor can be achieved, if needed, with mechanical design causing more turbulent flows and desired particle suspension in the catalytic reactor 400. Contact time between the catalyst and the pyrolytic vapor can be affected e.g. by the height of the catalytic reactor 400 and/or the flow velocity of the pyrolytic vapor.

A regenerator 420 is arranged next to the catalytic reactor 400. In the regenerator 420, used catalyst is received at the lower part of the regenerator. During regeneration, the catalyst moves upwards and is regenerated using the oxygen containing gas, such as air. Optionally, the catalyst may be fluidized in the regenerator by using at least some of the non-condensable gases (see FIG. 7). From an upper part of the regenerator 420, the regenerated catalyst is transferred to the catalyst reactor 400. Transfer of catalyst in between the reactors 400, 420 may be enhanced by a suitable conveyor, such as a screw (or screws).

Referring to FIG. 1, the fluidizing inert gas used in the catalytic reactor 400 may comprise at least one of nitrogen and the non-condensable gas (see FIG. 7). The non-condensable gas may be separated from other constituents of the treated pyrolytic vapor by condensing the the treated pyrolytic vapor in a condenser 810. The fluidizing inert gas may comprise at least one of nitrogen and the non-condensable gas in such a way that the inert gas comprises at most 10 vol % of gas that is neither nitrogen nor the non-condensable gas. Preferably the fluidizing inert gas comprises at most 1 vol % of gas that is neither nitrogen nor the non-condensable gas; or the inert gas consists of nitrogen the non-condensable gas. If the fluidizing inert gas comprises at least some of the non-condensable gas, the system comprises means 812 for conveying some of the non-condensable gas to the reactor 400, such as to the nozzles 424; optionally by mixing the non-condensable gas with other inert gas before feeding it into the reactor 400 (and the nozzles 424 thereof).

Moreover, the fluidized catalyst bed 410 of FIG. 1 is connected to a regenerator 420 arranged to regenerate the catalyst of the catalyst bed 410. In such an arrangement, some of the catalyst material is conveyed from the catalyst bed 410 to the regenerator 420. In the regenerator, the catalyst material is regenerated as discussed above. From the regenerator 420 some of the regenerated catalyst material is conveyed back to the catalyst bed 410. Some of the catalyst can be replaced by adding some makeup catalyst, thereby enabling to keep the optimized activity level of the catalyst. Some fresh catalyst may be conveyed to the catalyst bed 410 with the regenerated catalyst.

When regenerating the catalyst, the contaminants burn and some second flue gas is formed. As indicated in FIGS. 1, 2, and 5, in an embodiment, at least some of the second flue gas is conveyed from the regenerator 420 to the fluidized bed boiler 100. The second flue gas is hot, and the heat comprised by the flue gases can thus efficiently be used with the boiler's heat exchanger 700. Alternatively, or in addition, the second flue gas may be conveyed to the char burner 500 or the gas burner 600 (FIG. 3), provided they are present. As indicated above, also the reaction heat of the oxidizable compounds of the second flue gas can be thus recovered.

In FIGS. 1 and 2, a fluidized catalyst bed 410 is used. The regenerator 420 can be used therein as discussed above. In an embodiment, the catalyst is regenerated, and the resulting flue gas is conveyed back to the process, upstream of or into the pyrolysis reactor 200. The system comprises a corresponding pipeline 430 (see FIGS. 1, 2, 4, 5, 7, and 8).

FIG. 4 shows another embodiment of the pyrolysis system. The embodiment of FIG. 4 comprises, as the catalytic reactor 400, a catalytic reactor 400 having a stationary (i.e. fixed) catalyst bed 410. In contrast to a fluidized catalyst bed (see FIGS. 1-3), the catalyst material in the stationary catalyst bed 410 does not flow during operation. This provides for simpler equipment than a fluidized catalyst bed, and thus reduces the investment costs. However, the catalyst bed cannot be regenerated at the same time it is used to catalytically treat the raw pyrolytic vapors. Also in such embodiment, the pyrolytic vapor may flow in any direction through the catalyst bed.

In the embodiment of FIG. 4, the pyrolysis process can be stopped for the time when the catalytic material of the catalyst bed 410 is being regenerated. Alternatively, the catalyst bed can be bypassed and fast pyrolysis oil can be produced. It is noted that the whole fluidized bed boiler 100 may be functional all the time; only the pyrolysis (or at least the catalytic upgrading) needs to be stopped for regeneration of the catalyst. This can be achieved simply by stopping the material feed to the pyrolysis reactor 200 and/or stopping the raw pyrolysis vapor flow from the pyrolysis reactor 200 to the catalytic reactor 400. Thus, an embodiment of a method for producing treated pyrolytic vapors comprises at a first time, producing the treated pyrolysis vapor product; and at a second time, regenerating the catalyst material of the catalyst bed 410, wherein the first time is different from the second time. Moreover, in an embodiment, pyrolytic vapors are not catalytically treated at the second time. In the regeneration, some second flue gas is formed. The second flue gas may be conveyed to the fluidized bed boiler 100, such as to the furnace thereof, or to a char burner 500 or a gas burner 600 (see FIG. 3). Catalyst may be regenerated in the catalytic reactor 400; or a separate regenerator 420 may be used.

Referring to FIG. 5, continuous operation is achievable also with two fixed catalyst beds. The first catalytic reactor 400a and the second catalytic reactor 400b of FIG. 5 include a first fixed catalyst bed 410a and a second fixed catalyst bed 410b, respectively. At least some of the raw pyrolytic vapor in the vapor form is conveyed through the first catalyst bed 410a comprising catalyst material on a support. At the same time the catalyst material of the second catalyst bed 410b can be regenerated. The catalyst material of the second catalyst bed 410b can be regenerated in the second catalytic reactor 400b (as is the case in FIG. 5) or in a separate regenerator.

Referring to FIG. 3, the pyrolysis itself may be catalytic. That is, the pyrolysis reactor 200 may comprise catalyst material to catalyse the pyrolytic reaction taking place in the reactor 200. The embodiment of FIG. 3 comprises a low temperature char burner 500. The low temperature char burner 500 is used to burn (or at least partially oxidize) the char produced in the pyrolysis reactor 200. In the embodiment of FIG. 3, at least some of the char formed in the pyrolysis reactor 200 is conveyed from the pyrolysis reactor 200 into the char burner 500, and burned therein. The heat thus formed can be recovered in the char burner 500, to the particulate material of the char burner 500, or with heat exchanger in the char burner 500 and/or in a gas burner 600.

As the char comprises only relatively small amounts of burnable residues, the temperature inside the char burner 500 remains lower than in the fluidized bed 110 of the fluidized bed boiler 100. Moreover, the temperature of the char burner 500 can be kept low by supplying sub-stoichiometric amounts of free oxygen ($O_2$) into the char burner 500. This is indicated by the text "a little air" in FIG. 3. In FIG. 3, the char burner 500 is also a fluidized bed reactor, and it is arranged to supply the pyrolysis reactor 200 with heated second heat resistant particulate material. The second particulate material may comprise catalyst material. Suitable catalysts for the second particulate material include the same catalysts as recited above for the catalyst bed 410.

The temperature in the char burner is preferably at most 700° C. or at most 650° C. Thus, in an embodiment, fuel or pyrolyzable material that has not been thermally treated, is not fed to the char burner 500. Naturally the char residue from the pyrolysis reactor 200 can be conveyed to the char burner 500 with the particulate material. Alternatively, the low temperature can be achieved by burning only small amounts of fuel in the char burner 500. Still further, the amount of air can be kept low to decrease the temperature.

Since the char burner 500 may have a low free oxygen ($O_2$) content, the (third) flue gases produced therein may have some components that can be oxidized. Thus, the third flue gases can be conveyed to a separate gas burner 600. Alternatively, the third flue gases could be conveyed to the fluidized bed boiler 100 to be burned therein. Moreover, from the gas burner 600, the flue gases can be conveyed into the fluidized bed boiler in order to recover heat contained in the flue gases (see FIG. 3).

In practice, the char burner 500 typically does not produce sufficient amount of heat for the pyrolysis. Therefore, to control the temperature in the pyrolysis reactor 200, some hot first particulate material from the fluidized bed 110 of the fluidized bed boiler 100 can be used to heat the second particulate material. With reference to FIG. 3, a heat exchanger 103 can be used heat the second particulate material with the heat of the first particulate material. After the heat exchanger 103, the cooled first particulate material can be conveyed back to the boiler 100.

Since the amount of heating may be relatively low, in an embodiment some of the heated first particulate material may be intermixed with the heated second particulate material and/or conveyed to the pyrolysis reactor 200. To balance the amount of the particulate material(s) circulating in the pyrolysis reactor 200 and the char burner 500, some particulate material can be conveyed from the char burner 500 to the fluidized boiler 100.

In FIG. 3, as in FIG. 1, the arrow in the channel 102 indicates transfer of heated heat resistant particulate material from the fluidized bed boiler 100 such that the heat of the first particulate material will be used in the pyrolysis reactor 200. In FIG. 3, the channel 102 is arranged to convey the first particulate material into the heat exchanger 103. In FIG. 3, the channel 502 is arranged to convey the second particulate material from the heat exchanger 103 into the pyrolysis reactor 200. In FIG. 3, as in FIG. 1, the arrow in the channel 104 indicates transfer of first heat resistant particulate material back into the fluidized bed boiler 100 to be re-heated.

In the absence of the heat exchanger 103 particulate material(s) may be transferred indirectly from the pyrolysis reactor 200 to the boiler 100. This transfer takes place indirectly, i.e. through the channel 504 and the char burner 500. Still further, in the absence of the heat exchanger 103, some of the particulate materials may be transferred directly between the fluidized bed boiler 100 and the pyrolysis reactor 200.

As evident, the char burner 500 can be used in connection with a bubbling fluidized bed boiler, as shown in FIG. 3, but also in connection with a circulating fluidized bed boiler (see FIG. 2, even if a char burner 500 is not shown therein).

In FIG. 3, the system comprises a channel 502 for conveying hot second particulate material into the pyrolysis reactor 200. The boiler 100 is connected to the heat exchanger 103 in the channel 502. Equally well the boiler 100 could be connected to the channel 502 without the heat exchanger. Equally well the boiler 100 could be connected to the channel 504 for conveying second particulate material and char from the pyrolysis reactor 200 to the char burner 500; or to a heat exchanger in the channel 504. Equally well the boiler 100 could be connected to the char burner 500; or to a heat exchanger in the char burner 500. In the latter two cases (not shown in FIG. 3) and in the absence of a heat exchanger, at least some heat resistant particulate material would be conveyed indirectly, i.e. via the char burner 500, from the boiler 100 into the pyrolysis reactor 200. In the embodiments corresponding to FIG. 3, the first particulate material is used to heat the second particulate material circulated from the char burner 500 to the pyrolysis reactor 200. This may be done via a heat exchanger, or by contacting some of the first particulate material with the second particulate material.

To control the temperature of the pyrolysis reactor 200, heat may be recovered from the pyrolysis reactor 200 with a heat exchanger 705. The heat can be utilized e.g. by forming a single circulation of heat transfer medium, the circulation comprising the heat exchanger 705 of the pyrolysis reactor and the heat exchanger 700 of the boiler. In the alternative, the heat exchanger 705 of the pyrolysis reactor 200 could be included in another circulation e.g. for drying biomass or to heat the feed water for the boiler 100.

One benefit of catalytic upgrading of pyrolytic vapors is that by placing the catalytic reactor 400 after the pyrolysis reactor 200, the catalytic material of the reactor 400 is not exposed to impurities of pyrolyzable material. This is even more so, when the raw pyrolytic vapors are cleaned before catalytic upgarding. Such impurities degrade the catalyst rapidly. Therefore, a catalytic rector 400 is preferably used for the pyrolytic vapors, after the pyrolysis reactor, and after the vapor has been cleaned.

Thus, in an embodiment, catalytic pyrolysis is not used. This is because the catalysts deactivate rapidly, when exposed directly to the pyrolyzable material containing inorganic impurities present in for example biomass. It is noted that when a char burner 500 is not used, the pyrolysis reactor 200 is free from, or essentially free from catalyst materials. As indicated in e.g. FIG. 1, the system may be free from a char burner 500. Thus, in an embodiment, the pyrolysis reactor 200 surrounds pyrolysis materials including pyrolyzable material and first heat resistant particulate material and the pyrolysis materials do not comprise any specific catalyst material (i.e. any one of the aforementioned catalysts), or any catalyst material (e.g. any of the aforementioned catalyst materials). When a catalyst is not used, the first heat resistant particulate material preferably comprises sand. It may comprise e.g. at least 90 w % sand.

As derivable from above, the system of FIGS. 1 to 8 comprises at least
- a pyrolysis reactor 200, arranged to pyrolyze pyrolyzable material to produce raw pyrolytic vapors and char from pyrolyzable material,
- a fluidized bed boiler 100, which may be a bubbling fluidized bed boiler (see FIG. 1) or a circulating fluidized bed boiler (see FIG. 2), and
- a catalytic reactor 400 having a catalyst bed 410, which may comprise at least one stationary, i.e. fixed, catalyst bed (see FIGS. 4 and 5) or a fluidized catalyst bed (see FIGS. 1 and 2).

Moreover, the system comprises various pipelines suitable for conveying pyrolytic vapors (processed and/or raw) and channels suitable for conveying the heat resistant particulate material; in addition to pipelines and/or channels for feeding air, fuel, and pyrolyzable biomass. In addition the system may comprise pipelines and/or channels for conveying char, coke, non-condensable gas, and/or water-rich fraction from one component of the system to another. Such conveying has been discussed above.

The system of FIGS. 1 to 8 optionally comprises e.g.
- a cleaning arrangement 210 configured to remove at least some aerosols and/or solid particles from the raw pyrolytic vapors to produce clean pyrolytic vapors,
- a low temperature char burner 500 (see FIG. 3) configured to regenerate the catalyst used in the pyrolysis reactor 200 and burn the char formed in the pyrolysis reactor 200,
- a regenerator 420 configured to regenerate the catalyst of the catalytic reactor 400,
- a pipeline configured to convey flue gas from the regenerator 420 or the catalytic reactor 400 to the fluidized bed boiler 100, the char burner 500 or the gas burner 700,
- a heat exchanger 700 arranged to recover heat from the fluidized bed boiler,
- a heat exchanger 705 arranged to recover heat from the pyrolysis reactor 200, and
- both a heat exchanger 700 arranged to recover heat from the fluidized bed boiler a and a steam turbine 710 arranged to mechanical energy for a generator 720 to produce electricity by using the heat recovered by the heat exchanger 700 (see FIG. 4).

Figure 6:
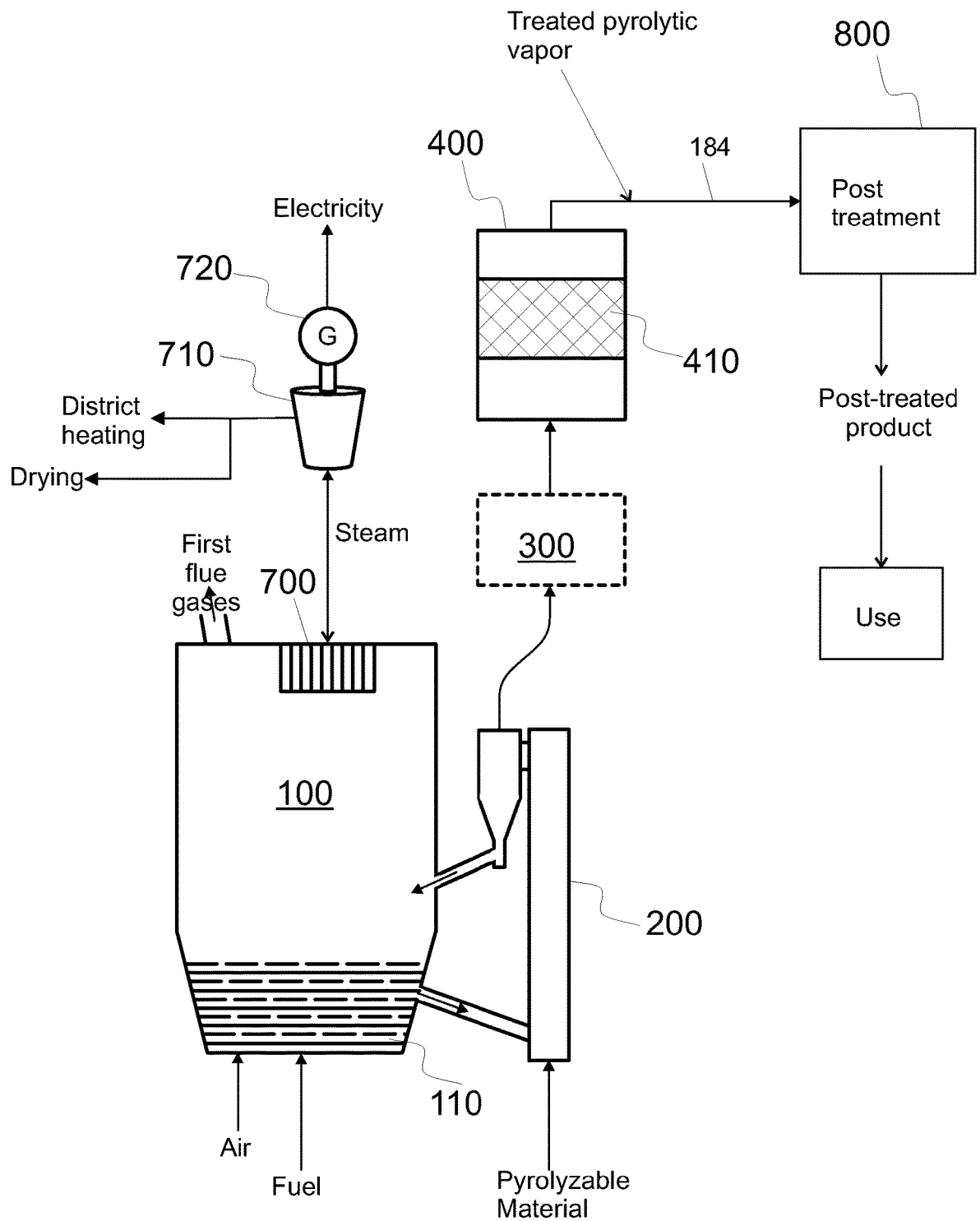
FIG. 6 shows a system similar to that of FIG. 4 and means for post treating the catalytically treated pyrolytic vapors.

The treated pyrolytic vapour as such can be post treated with means 800 for post treating the vapors, as indicated in FIGS. 6 to 8. Referring to FIG. 7, the treated pyrolytic vapour can be condensed to crude condensate in a condenser 810. the crude condensate can be separated (e.g. in a first separator 815) to two phases; a water rich phase and an oil rich phase. These phases can be separated from each other, resulting in water and dried condensate, i.e. bio-crude (see FIG. 7). The bio-crude can also be considered as one product of the process.

For example the treated pyrolytic vapour can be condensed to crude condensate, and the crude condensate can be post treated, as indicated in FIG. 8. In the alternative the bio-crude can be post treated, as indicated in FIG. 8 (see also FIG. 7). The separator 815 of FIG. 8 is optional, as indicated by the dotted lines.

Post treatment may include at least one of
hydrotreatment, chemicals separation, or biomaterials production;
separation with known techniques, such as: filtering, particle separation, fractionation, vacuum distillation;
thermal treatment;
processing in dedicated biorefinery; or
co-processing or processing in conventional oil refinery or petrochemical plant.

The quality of some pyrolytic products can be improved by hydrotreatment, i.e. a catalytic treatment at a high temperature, under a high pressure, and with the presence of reasonable amount of hydrogen.

With reference to FIGS. 7 and 8, the means 800 for post-treating the catalytically treated pyrolytic vapor may comprise
a condenser 810 configured to condense at least part of the catalytically treated pyrolytic vapor to a crude condensate, and
optionally, a first separator 815 configured to separate water from the crude condensate to produce a water rich phase and bio-crude.

As shown in FIGS. 7 and 8, when some of the catalytically treated pyrolytic vapor is condensed to crude condensate, not all constituents become condensed. Thereby non-condensable gases will be produced as a side product. These non-condensable gases may be conveyed to the catalytic reactor 400 (as discussed above and shown in FIGS. 7 and 8), the pyrolysis reactor 200, to the fluidized bed boiler 100, to the gas burner 600 (see FIG. 3), or to the char burner 500 (see FIG. 3). In an embodiment, the catalytic reactor 400 of the system comprises a fluidized catalyst bed 410, and at least some of the non-condensable gas is used for fluidizing the catalyst of the catalyst bed. Thus an embodiment comprises a pipeline 812 for feeding the non-condensable gas from the condenser 810 to the catalytic reactor 400, e.g. to the nozzles 424 (see FIG. 1) for fluidizing the catalyst.

Referring to FIG. 7, in case a condenser 810 is used to condense the treated pyrolytic vapor, a separator 815 can be used to separate water from the crude condensate to obtain bio-crude. Thus, the bio-crude may be seen as a product of the process.

The post treatment of the treated pyrolytic vapour may be selected according to needs of use or intended use. Uses of treated pyrolytic vapour and/or post-treated pyrolytic vapour include
replacement, and/or substitution of fossil fuel oils,
emulsions with fossil oils in heat and power production in demanding applications such as household use,
internal combustion engines compression ignition engines and gas turbines),
marine fuel substitution, and
use as biochemicals in applications such as wood impregnation, adhesives production, cosmetics, and food industry.

As evident from this list, the catalytically treated and condensed to liquid form, pyrolytic vapour can be used in many such applications, where conventional, untreated, pyrolytic product is unusable.

The following examples summarize some embodiments:
1. A method for producing treated pyrolytic vapor product from pyrolyzable material, the method comprising,
    burning fuel in a fluidized bed boiler 100, thereby producing flue gas (i.e. first flue gas) and heat,
    heating some first heat resistant particulate material comprised by a fluidized bed 110 of the fluidized bed boiler 100 with said heat,
    optionally, heating some second heat resistant particulate material using the heated first heat resistant particulate material,
    transferring at least some of the heated first heat resistant particulate material or the heated second heat resistant particulate material into a pyrolysis reactor 200,
    conveying some pyrolyzable material into the pyrolysis reactor 200,
    pyrolyzing the pyrolyzable material in the pyrolysis reactor 200 by contacting the pyrolyzable material with the heated first heat resistant particulate material or the heated second heat resistant particulate material, thereby producing at least raw pyrolytic vapor,
    conveying at least part of the raw pyrolytic vapor in the vapor form through a catalyst bed 410 comprising catalyst material; thereby treating catalytically at least the part of the raw pyrolytic vapor and in this way producing the treated pyrolytic vapor product.
2. The method of the example 1, comprising
    cleaning at least some of the raw pyrolytic vapor thereby producing clean pyrolytic vapor; preferably cleaning with at least a cyclone 220; and more preferably cleaning with a cyclone 220 and at least one of a filter 300, a guard bed 310, and another cyclone; and
    conveying at least some of the clean pyrolytic vapor in the vapor form through the catalyst bed 410.
3. The method of the example 1 or 2, wherein
    the pyrolyzable material comprises carbon;
    preferably the pyrolyzable material comprises at least 50 w % residue derived material and/or at least 50 w % biomass.
4. The method of any of the examples 1 to 3, comprising
    recovering heat from the flue gas to a heat transfer medium, such as a heat transfer medium comprising at least one of water vapor and water, by using a heat exchanger 700 arranged in the fluidized bed boiler 100; and
    optionally, producing electricity using said heat and/or using said heat to dry at least one of the fuel and the pyrolyzable material and/or using said heat for other useful applications such as district heat production or heat for other industrial processes.
5. The method of any of the examples 1 to 4, comprising
    regenerating at least some catalyst material of the catalyst bed 410, thereby producing some second flue gas, and
    conveying at least some of the second flue gas back to the process, such as into the catalytic reactor 400 or upstream of or into the pyrolysis reactor 200; such as into the fluidized bed boiler 100.
6. The method of any of the examples 1 to 5, wherein
    the pyrolyzable material comprises at least 50 w % solids that originate from agriculture, such as wood.

7. The method of any of the examples 1 to 6, wherein
the catalyst material of the catalyst bed 410 and/or the second particulate material has a deoxygenating functionality.
8. The method of any of the examples 1 to 7, wherein
the catalyst material of the catalyst bed 410 and/or the second particulate material is a multifunctional catalyst.
9. The method of any of the examples 1 to 8, wherein
the catalyst material of the catalyst bed 410 and/or the second particulate material is selected from a group of catalysts having condensation, decarbonylation, and decarboxylation functionalities.
10. The method of any of the examples 1 to 9, wherein
the pressure in the pyrolysis reactor 200 is greater than or equal to the pressure in the catalyst bed 410 and/or
the pressure in the fluidized bed boiler 100 is greater than or equal to the pressure in the pyrolysis reactor 200.
11. The method of any of the examples 1 to 10, wherein
the temperature inside the catalyst bed 410 is from 400° C. to 700° C.
12. The method of any of the examples 1 to 11, wherein
the pressure of the vapors in the catalyst bed 410 is less than 2 bar(a).
13. The method of any of the examples 1 to 12, wherein
no external hydrogen is fed to the process in between the pyrolysis reactor 200 and the catalyst bed 410 or into the catalyst bed 410.
14. The method of any of the examples 1 to 13, wherein
the pressure of the vapors in the pyrolysis reactor 200 is less than 2 bar(a).
15. The method of any of the examples 1 to 14, comprising
heating the pyrolyzable material in the pyrolysis reactor 200 at a temperature from 400° C. to 700° C.
16. The method of any of the examples 1 to 15, comprising
pyrolyzing the pyrolyzable material in such a way that the raw pyrolytic vapor, before the catalytic treatment, has a first content of oxygen atoms bound to condensable compound(s) comprising also hydrogen and carbon and
treating catalytically the pyrolytic vapor in the catalyst bed 410 in such a way that the treated pyrolytic vapor product has a second content of oxygen atoms bound to condensable compound(s) comprising also hydrogen and carbon, wherein
the second oxygen content is less than the first oxygen content, and
the boiling point of each condensable compound is at least 25° C. in a pressure of 1 atm;
wherein the first oxygen content refers to the first content of oxygen atoms and the second oxygen content refers to the second content of oxygen atoms.
17. The method of the example 16, wherein
the second oxygen content is less than the first oxygen content by at least 15 percentage units, preferably by at least 25 percentage units, wherein the first and the second contents of oxygen atoms are measured in w % relative to such condensable compounds of the corresponding vapor that comprise hydrogen and carbon, wherein
the boiling point of each condensable compound is at least 25° C. in a pressure of 1 atm.
18. The method of any of the examples 1 to 17, comprising
condensing at least some of the treated pyrolytic vapor product to a crude condensate, thereby producing some non-condensable gas as a side product, and
optionally feeding at least some of the non-condensable gas back to the process, upstream of said condensing; preferably into a catalytic reactor 400 comprising the catalyst bed 410.
19. The method of example 18, comprising
separating water from the crude condensate thereby producing bio-crude.
20. The method of any of the examples 1 to 19 wherein
the partial pressure of hydrogen of the vapors in the catalyst bed 410 is less than 0.5 bar; preferably less than 0.2 bar.
21. The method of any of the examples 1 to 20, comprising
forming a fluidized bed 410 from the catalyst material of the catalyst bed 410,
conveying some of the catalyst material from the fluidized bed 410 to a regenerator 420,
regenerating the catalyst material in the regenerator 420, and
conveying some of the regenerated catalyst material from the regenerator 420 to the fluidized bed 410.
22. The method of the example 21 comprising
condensing some of the treated pyrolytic vapor product to a crude condensate and non-condensable gas, and
forming a fluidized bed 410 from the catalyst material of the catalyst bed 410 by utilizing some fluidizing gas, wherein
the fluidizing gas comprises at least some of the non-condensable gas.
23. The method of any of the examples 1 to 22, comprising
using a first catalyst bed 410a and a second catalyst bed 410b by
conveying at least some of the raw pyrolytic vapor in the vapor form through the first catalyst bed 410a comprising catalyst material, meanwhile
regenerating the catalyst material of the second catalyst bed 410b;
optionally,
the catalyst material of the second catalyst bed 410b is regenerated in a second catalytic reactor 400b comprising the second catalyst bed 410b, the second catalytic reactor 400b being also configured to catalytically treat pyrolytic vapour or
the catalyst material of the second catalyst bed 410b is regenerated in a regenerator, and the catalyst material of the second catalyst bed 410b has been transferred from a second catalytic reactor 400b to the regenerator to be regenerated therein.
24. The method of any of the examples 1 to 23, comprising
at a first time, conveying at least part of the raw pyrolytic vapor in the vapor form through a catalyst bed 410 and
at a second time, regenerating the catalyst material of the catalyst bed 410, wherein
at the second time, pyrolytic vapour is not conveyed through the catalyst bed 410;
optionally,
the catalyst material of the catalyst bed 410 is regenerated in the catalytic reactor 400 comprising the catalyst bed 410 or
the catalyst material of the catalyst bed 410 is regenerated in a regenerator, and the catalyst material of the catalyst bed 410 has been transferred from the catalytic reactor 400 to the regenerator to be regenerated therein.

25. The method of any of the examples 5 or 21 to 24, wherein said regenerating comprises
   allowing the catalyst material and/or some other material, such as coke, formed or deposited in or on the catalyst material to react
      in the regenerator 420 or the catalyst bed 410, 410a, 410b,
      with free oxygen ($O_2$), and
      at a temperature from 400° C. to 1000° C.
26. The method of the example 25, wherein
   in said regenerating, the catalyst material or the other material, such as coke, formed or deposited in or on the catalyst material, is allowed to react in a pressure from 0.5 bar(a) to 1.5 bar(a).
27. The method of any of the examples 1 to 26, wherein
   the first heat resistant particulate material of the fluidized bed 110 of the fluidized bed boiler 100 comprises at least one of sand, limestone, kaolin, and alumina.
28. The method of any of the examples 1 to 27 comprising
   producing also char by pyrolyzing the pyrolyzable material,
   transferring some of the char into a furnace, such as a fluidized bed boiler 100 or a char burner 500,
   burning the char in the furnace (100, 500) to produce heat, and
   recovering the heat produced by burning the char.
29. The method of the example 28, comprising
   transferring at least some of the heated first heat resistant particulate material from the fluidized bed boiler 100, directly or indirectly, into a pyrolysis reactor 200, and
   pyrolyzing the pyrolyzable material in the pyrolysis reactor 200 by contacting the pyrolyzable material with the heated first heat resistant particulate material.
30. The method of the example 29 comprising
   transferring some of the char from the pyrolysis reactor 200, directly or indirectly into the fluidized bed boiler 100 to be burned therein, and
   burning some of the char in the fluidized bed boiler 100.
31. The method of any of the examples 1 to 30, wherein
   the pyrolysis in the pyrolysis reactor 200 takes place without any catalyst.
32. The method of any of the examples 27 to 31, wherein
   the particulate material of the fluidized bed 110 of the fluidized bed boiler 100 comprises sand.
33. The method of the example 28, comprising
   heating the second heat resistant particulate material using the heated first heat resistant particulate material,
   transferring at least some of the heated second heat resistant particulate material into the pyrolysis reactor 200, and
   pyrolyzing the pyrolyzable material in the pyrolysis reactor 200 by contacting the pyrolyzable material with the heated second heat resistant particulate material.
34. The method of the example 33, comprising
   using a heat exchanger 103 to heat the second heat resistant particulate material.
35. The method of the example 33 or 34, comprising
   transferring some of the char from the pyrolysis reactor 200 into a char burner 500,
   burning some of the char in the char burner 500, and
   recovering the heat produced by burning the char.
36. The method of any of the examples 33 to 35, wherein
   the second heat resistant particulate material comprises catalyst, whereby
   the pyrolysis in the pyrolysis reactor 200 takes place with some catalyst.
37. The method of any of the examples 1 to 36, comprising
   treating catalytically the pyrolytic vapor in the catalyst bed 410 in such a way that a composition; that is obtained from the treated pyrolytic vapor product as a remainder after condensation at a temperature from 5° C. to 60° C. and in atmospheric pressure, and after subsequent separation of water rich fraction; has a total acid number between 0 and 50, the total acid number being defined in the standard ASTM D664-81.
38. The method of any of the examples 1 to 37, comprising
   utilizing the heat and/or the reaction heat of a side product.
39. The method of the example 38, wherein the side product is one of
   heat of the treated pyrolytic vapor product, e.g. by utilizing the heat of a condenser 810 configured to condense the treated pyrolytic vapor product,
   heat of the non-condensable gases intermixed with treated pyrolytic vapor product, e.g. by utilizing the heat of a condenser 810 configured to condense the treated pyrolytic vapor product,
   water rich fraction, obtained from treated pyrolytic vapor by condensing and separation,
   char that is produced in the pyrolysis reactor 200,
   coke that is produced in the catalytic reactor 400,
   flue gas, such as flue gas produced in one of
      the boiler 100,
      a regenerator 420,
      the catalytic reactor 400 during regeneration of catalyst,
      a char burner 500, and
      a gas burner 600, and
   non-condensable gases remaining after condensing of treated pyrolytic vapor product.
40. The method of example 38 or 39, comprising
   utilizing the heat and/or the reaction heat of char and/or coke that is produced in the pyrolysis reactor 200 and/or catalytic reactor 400 and
   utilizing the heat and/or the reaction heat of water rich fraction and/or non-condensable gases obtainable from treated pyrolytic vapor product by condensing.
41. The method of the example 40, wherein
   the heat and/or the reaction heat of water rich fraction and/or non-condensable gases are utilized in post-treatment 800 with the other constituents of the treated pyrolytic vapor product without condensing the treated pyrolytic vapor product.
42. The method of the example 40, comprising
   condensing a part of treated pyrolytic vapor product in a condenser 810, thereby separating the non-condensable gases, and
   optionally recovering heat from the condenser 810.
43. The method of the example 42, wherein the heat and/or the reaction heat of non-condensable gases are utilized in post-treatment by
   feeding at least some of the separated non-condensable gases to a post-treatment unit 800 arranged downstream of the condenser 810.
44. The method of any of the examples 38 to 43, wherein the heat and/or the reaction heat of water rich fraction and/or non-condensable gases are utilized by
   feeding at least some of the separated water rich fraction and/or non-condensable gases back to the process, upstream of the condenser 810.
45. The method of any of the examples 38 to 44, comprising
   feeding at least some of the water rich fraction and/or the non-condensable gases and/or coke to the catalytic reactor 400 or the regenerator 420.

46. The method of the example 44 or 45, comprising feeding at least some of the non-condensable gases to the pyrolysis reactor 200.
47. The method of any of the examples 44 to 46, comprising feeding at least some of the water rich fraction and/or the non-condensable gases to the fluidized bed boiler 100.
48. The method of any of the examples 44 to 47, comprising feeding at least some of the water rich fraction and/or the non-condensable gases to a gas burner 600.
49. The method of any of the examples 44 to 48, comprising feeding at least some of water rich fraction and/or the non-condensable gases to a char burner 500.
50. The method of any of the examples 1 to 49, comprising
    pyrolyzing the pyrolyzable material in such a way that raw bio-crude; which is obtainable from the raw pyrolytic vapour, before the catalytic treatment in the catalyst bed, as remainder after condensation at a temperature from 5° C. to 60° C. and in atmospheric pressure, and after subsequent separation of water rich fraction; has a first oxygen content, the first oxygen content being the content of oxygen atoms bound to such compound(s) of the raw bio-crude that also comprise hydrogen and carbon and
    treating catalytically the pyrolytic vapor in the catalyst bed 410 in such a way that bio-crude; which is obtainable from the catalytically treated pyrolytic vapor product, as remainder after condensation at a temperature from 5° C. to 60° C. and in atmospheric pressure, and after subsequent separation of water rich fraction; has a second oxygen content, the second oxygen content being the content of oxygen atoms bound to such compound(s) of the bio-crude that comprise also hydrogen and carbon, wherein
    the second oxygen content is less than the first oxygen content; wherein preferably
    the second oxygen content is less than the first oxygen content by at least 15 percentage units, wherein the first and the second contents of oxygen atoms are measured in w % relative to the mass of the raw bio-crude and the bio-crude, respectively.
51. A system configured to produce treated pyrolytic vapor product from pyrolyzable material, the system comprising
    a fluidized bed boiler 100 that is
        configured to burn fuel in a fluidized bed 110 comprising first heat resistant particulate material and by said burning
            arranged to heat the first heat resistant particulate material of the fluidized bed 110, and
            arranged to produce flue gas (i.e. first flue gas),
        means 150 for feeding fuel—such as a channel 150, a conveyor, or a pipeline 150 configured to feed fuel—into the fluidized bed boiler 100,
        means 152 for feeding combusting gas such as air—such as a pipeline 152 configured to feed combusting gas such as air—into the fluidized bed boiler 100,
    a pyrolysis reactor 200 arranged to produce raw pyrolytic vapor and char from pyrolyzable material,
        means 160 for feeding pyrolyzable material—such as a channel 160, a conveyor, or a pipeline 150, configured to feed pyrolyzable material—into the pyrolysis reactor 200,
        optionally, means for heating some second heat resistant particulate material using the first heat resistant particulate material—such as a heat exchanger 103 arranged to exchange heat between the first heat resistant particulate material and the second heat resistant particulate material,
        means 102 for conveying some of the first heat resistant particulate material or the second heat resistant particulate material—such as a channel 102 configured to convey some of the first heat resistant particulate material or some of the second heat resistant particulate material—into the pyrolysis reactor 200,
    a catalyst bed 410 comprising catalyst material and arranged inside a catalytic reactor 400 in such a way that at least a part of the pyrolytic vapor that is conveyed into the catalytic reactor 400 is arranged to flow through the catalyst bed 410 inside the catalytic reactor 400, and
    a pipeline 230, 232 arranged to convey at least a part of the raw pyrolytic vapor from the pyrolysis reactor 200 into the catalytic reactor 400, optionally via a cleaning arrangement 210, 220, 300, 310.
52. The system of the example 51 comprising
    a cleaning arrangement 210 configured to remove at least some aerosols and/or solid particles from raw pyrolytic vapors to produce clean pyrolytic vapor, and
    a pipeline 230, 232 arranged to convey at least some clean pyrolytic vapor from the cleaning arrangement 210 into the catalytic reactor 400.
53. The system of the example 51 or 52, wherein the cleaning arrangement 210 comprises at least one of
    a cyclone 220,
    a filter 300, and
    a guard bed 310;
preferably the cleaning arrangement 210 comprises a cyclone 220 and at least one of a filter 300, a guard bed 310, and another cyclone.
54. The system of any of the examples 51 to 53, wherein the fluidized bed boiler 100 comprises
    a heat exchanger 700 arranged inside the fluidized bed boiler 100 and arranged to recover heat from flue gas therein (i.e. from the first flue gas); and
    optionally, a steam turbine 710 in connection with an electricity generator 720 arranged to generate electricity by using the heat recovered by the heat exchanger 700
    and optionally a heat exchanger to produce district heat or heat for other industrial processes.
55. The system of any of the examples 51 to 54 comprising
    a pipeline 430 configured to convey at least some second flue gas, the second flue gas being produced by regenerating the catalyst material of the catalyst bed 410, 410a or 410b in a regenerator 420 or in the catalytic reactor 400, 400a, 400b, back to the system, such as into the catalytic reactor or upstream of or into the pyrolysis reactor 200, such as into the fluidized bed boiler and
    means for feeding in combusting gas, such as air, into the regenerator 420 or catalytic reactor 400, 400a, 400b—such as a pipeline configured to convey combusting gas, such as air, into the regenerator 420 or catalytic reactor 400, 400a, 400b.
56. The system of any of the examples 51 to 55, wherein the catalyst material is selected from catalysts having deoxygenating functionality.
57. The system of any of the examples 51 to 56, wherein the catalyst material is selected from a group of catalysts having condensation, decarbonylation, and decarboxylation functionalities.
58. The system of any of the examples 51 to 57, wherein the system does not comprise means for increasing the pressure of the raw pyrolytic vapor, such as a fan or a compressor, in such a way that the pressure of the pyrolytic vapor in the catalyst bed 410, in use, would be greater than the pressure in the pyrolysis reactor 200.

59. The system of any of the examples 51 to 58, wherein
the catalytic reactor 400 comprises means 421 for feeding inert gas into the catalytic reactor 400 and for fluidizing the catalyst material—such as a grate 422 and nozzles 424, in combination configured to feed inert gas into the catalytic reactor 400 and to fluidize the catalyst material—to form a fluidized catalyst bed, and the system comprises
a regenerator 420,
means 426 for conveying at least some of the catalyst material from the catalytic reactor 400 to the regenerator 420—such as a channel 426 configured to convey at least some of the catalyst material from the catalytic reactor 400 to the regenerator 420,
means 428 for conveying at least some of the catalyst material from the regenerator 420 to the catalytic reactor 400—such as a channel 428 configured to convey at least some of the catalyst material from the regenerator 420 to the catalytic reactor 400, and
means for feeding in catalyst material to the regenerator 420 or the catalytic reactor 400—such as a channel configured to convey catalyst material to the regenerator 420 or the catalytic reactor 400.

60. The system of the example 59 comprising,
a condenser 810 arranged to condense some of the treated pyrolytic vapor product to a crude condensate and non-condensable gas and
means 812 for conveying at least some of the non-condensable gas from the condenser 810 to the catalytic reactor 400—such as a pipeline 812 configured to convey at least some of the non-condensable gas from the condenser 810 to the catalytic reactor 400;
preferably
the means 812 or the pipeline 812 is configured to convey at least some of the non-condensable gas from the condenser 810 to the means 421 for fluidizing the catalyst material, such as to the nozzles 424.

61. The system of any of the examples 51 to 60, comprising the catalytic reactor 400, and a second catalytic reactor 400b,
the pipeline 230, 232 and another pipeline 232b, the other pipeline 232b being configured to convey at least a part of the raw pyrolytic vapor from the pyrolysis reactor 200 (optionally via cleaning arrangement 210) into the second catalytic reactor 400b, and
a valve 234, configured to
at a first time, guide the raw pyrolytic vapor from the pyrolysis reactor only to the pipeline 230, 232, and
at a second time, guide the raw pyrolytic vapor from the pyrolysis reactor only to the other pipeline 232b.

62. The system of any of the examples 51 to 61, wherein the system does not comprise means for feeding external hydrogen in between the pyrolysis reactor 200 and the catalyst bed 410 or into the catalyst bed 410.

63. The system of any of the examples 51 to 62, wherein the fluidized bed boiler 100 surrounds a fluidized bed 110 comprising first heat resistant particulate material, and the first heat resistant particulate material comprises at least one of sand, limestone, kaolin, and alumina.

64. The system of any of the examples 51 to 73, comprising
means (104, 504) for conveying some char from the pyrolysis reactor 200 into a furnace, such as into a fluidized bed boiler 100 or a char burner 500—such as a channel 104, 504 configured to convey some char from the pyrolysis reactor 200 into a furnace, such as into the fluidized bed boiler 100 or into the char burner 500, and
means for recovering the heat produce by burning the char, such as a heat exchanger 700 of the fluidized bed boiler 100, a heat exchanger of the char burner 500, or a heat exchanger of the gas burner 600; and
optionally, a pipeline for conveying third or fourth flue gases from the char burner 500, directly or via a gas burner 600, to the fluidized bed boiler 100.

65. The system of the example 64, comprising
means 102 for conveying some of the first heat resistant particulate material of the fluidized bed 110—such as a channel 102 configured to convey some of the first heat resistant particulate material of the fluidized bed 110— from the fluidized bed 110, directly or indirectly, into the pyrolysis reactor 200, and
means 104 for conveying some of the first heat resistant particulate material from the pyrolysis reactor 200— such as a channel 104 configured to convey some of the first heat resistant particulate material from the pyrolysis reactor 200—directly or indirectly into the fluidized bed boiler 100 to be re-heated therein.

66. The system of the example 64 or 65, comprising
means for transferring some of the char from the pyrolysis reactor 200, directly or indirectly into the fluidized bed boiler 100 to be burned therein—such as a channel 104 configure to transfer some of the char from the pyrolysis reactor 200, directly or indirectly into the fluidized bed boiler 100 to be burned therein.

67. The system of the example 65 or 66, wherein
the pyrolysis materials do not comprise any catalyst.

68. The system of the example 64, comprising
means for transferring some of the char from the pyrolysis reactor 200 into a char burner 500—such as a channel 504 configured to transfer some of the char from the pyrolysis reactor 200 into a char burner 500.

69. The system of the example 64 or 68, comprising
a heat exchanger 103 configured to exchange heat between the first heat resistant particulate material and the second heat resistant particulate material,
means 102 for conveying some of the first heat resistant particulate material of the fluidized bed 110—such as a channel 102 configured to convey some of the first heat resistant particulate material of the fluidized bed 110— from the fluidized bed 110 to the heat exchanger 103,
means 104 for conveying some of the first heat resistant particulate material from the heat exchanger 103—such as a channel 104 configured to convey some of the first heat resistant particulate material from the heat exchanger 103—into the fluidized bed boiler 100 to be re-heated therein,
means 502 for conveying some of the second heat resistant particulate material—such as a channel 502 configured to convey some of the second heat resistant particulate material—from the heat exchanger 103 to the pyrolysis reactor 200, and
means 504 for conveying some of the second heat resistant particulate material from the pyrolysis reactor 200—such as a channel 504 configured to convey some of the second heat resistant particulate material from the pyrolysis reactor 200—into the heat exchanger 103 to be re-heated therein, 70. The system of the example 68 or 69, wherein
the pyrolysis reactor 200 surrounds pyrolysis materials including at least pyrolyzable material some of the second heat resistant particulate material and
the pyrolysis materials comprise some catalyst.

71. The system of any of the examples 51 to 70, wherein the catalytic reactor 400 is configured to withstand a pressure of at least 2 bar(a) at the temperature 700° C., and
the catalytic reactor 400 is configured not to withstand a pressure of at least 50 bar(a) at the temperature 700° C.
72. The system of any of the example 51 to 71, comprising a post treatment unit 800, and
means for conveying at least some of the treated pyrolytic vapor product or bio-crude to the post treatment unit 800—such a pipeline configured to convey at least some of the treated pyrolytic vapor product or bio-crude to the post treatment unit 800.
73. The system of any of the examples 51 to 72, comprising a condenser 810 arranged to condense some of the treated pyrolytic vapor product to a crude condensate, thereby separating also non-condensable gas,
means for conveying the treated pyrolytic vapour product from the catalytic reactor 400 to the condenser 810—such as a pipeline configured to convey the treated pyrolytic vapour product from the catalytic reactor 400 to the condenser 810, and
optionally, means for recovering heat from the condenser—such as a heat exchanger configured to recover heat from the condenser.
74. The system of the example 73, comprising
a separator 815 configured to separate water rich fraction from the crude condensate to produce the water rich fraction and some bio-crude and
means for conveying crude condensate from condenser 810 to the said separator 815—such as a pipeline configured to convey crude condensate from condenser 810 to the said separator 815.
75. The system of example 74, comprising
means for feeding the water rich fraction back to the process upstream of the separator 815, e.g. to the fluidized bed boiler 100, the catalytic reactor 400, 400a, 400b, and/or the regenerator 420; —such as a pipeline configured to convey water rich fraction from a separator 815 to at least one of the fluidized bed boiler 100, the catalytic reactor 400, 400a, 400b, and/or the regenerator 420.
76. The system of any of the examples 73 to 75, comprising a post treatment unit 800 arranged downstream of the condenser 810, and
means for conveying at least some of the non-condensable gases from the condenser 810 to the post treatment unit 800—such a pipeline configured to convey conveying at least some of the non-condensable gases from the condenser 810 to the post treatment unit 800.
77. The system of any of the examples 73 to 76, comprising means for conveying at least some of the non-condensable gases from the condenser 810 back to the system, upstream of said condenser 810—such as a pipeline configured to convey conveying at least some of the non-condensable gases from the condenser 810 back to the system, upstream of said condenser 810.
78. The system of the example 77, comprising
means for conveying at least some of the non-condensable gases from the condenser 810 to the catalytic reactor 400—such a pipeline configured to convey at least some of the non-condensable gases from the condenser 810 to the catalytic reactor 400 and/or regenerator 420.
79. The system of the example 77 or 78, comprising
means for conveying at least some of the non-condensable gases from the condenser 810 to the pyrolysis reactor 200—such a pipeline configured to convey at least some of the non-condensable gases from the condenser 810 to the pyrolysis reactor 200.
80. The system of any of the examples 77 to 79, comprising means for conveying at least some of the non-condensable gases from the condenser 810 to the fluidized bed boiler 100—such a pipeline configured to convey at least some of the non-condensable gases from the condenser 810 to the fluidized bed boiler 100.
81. The system of any of the examples 77 to 80, comprising a char burner 500 and
means for conveying at least some of the non-condensable gases from the condenser 810 to the char burner 500—such a pipeline configured to convey at least some of the non-condensable gases from the condenser 810 to the char burner 500.
82. The system of any of the examples 77 to 81, comprising a gas burner 600 and
means for conveying at least some of the non-condensable gases from the condenser 810 to the gas burner 600—such a pipeline configured to convey at least some of the non-condensable gases from the condenser 810 to the gas burner 600.
83. The system of any of the examples 77 to 81, comprising a gas burner 600 and
means for conveying gas from the char burner 500 to the gas burner 600
such a pipeline configured to convey gas from the char burner 500 to the gas burner 600,
means for conveying combusting gas, such as air to the gas burner 600—such a pipeline configured to convey combusting gas, such as air, to the gas burner 600, and
means for conveying flue gases to the fluidized bed boiler 100 from the gas burner 600—such a pipeline configured to convey flue gas from the gas burner to the fluidized bed boiler 100.
84. The system of any of the example 82, comprising
means for conveying gas from the char burner 500 to the gas burner 600—such a pipeline configured to convey gas from the char burner 500 to the gas burner 600,
means for conveying combusting gas, such as air to the gas burner 600—such a pipeline configured to convey combusting gas, such as air, to the gas burner 600, and
means for conveying flue gases to the fluidized bed boiler 100 from the gas burner 600—such a pipeline configured to convey flue gas from the gas burner to the fluidized bed boiler 100.

The invention claimed is:
1. A method for producing crude condensate from pyrolyzable material comprising:
burning fuel in a fluidized bed boiler to produce flue gas and heat,
heating a first particulate material comprised by a fluidized bed of the fluidized bed boiler with said heat,
optionally, heating a second particulate material using the heated first particulate material,
transferring at least a portion of the heated first particulate material or at least a portion of the heated second particulate material to a pyrolysis reactor,
conveying the pyrolyzable material into the pyrolysis reactor,
pyrolyzing the pyrolyzable material in the pyrolysis reactor by contacting the pyrolyzable material with the heated first particulate material or the heated second particulate material to produce at least raw pyrolytic vapor comprising non-condensable gases, oxygenated condensable hydrocarbons, and char, cleaning at least a portion of the raw pyrolytic vapor to produce a clean pyrolytic vapor and char, transferring a portion of the char back into the fluidized bed boiler or into a char burner, burning the char in the fluidized bed boiler or in the char burner to produce heat, and transferring the heat back to the pyrolysis reactor, deoxygenating at least part of the clean pyrolytic vapor in the presence of a catalyst bed comprising catalyst material and at a partial pressure of hydrogen in the catalyst bed of less than 0.5 bar to produce a treated pyrolyticvapor product, and separating at least a portion of the treated pyrolytic vapor product into a crude condensate comprising bio-crude and non-condensable gas comprising carbon oxides, hydrogen, and methane.

2. The method of claim 1, further comprising the step of feeding at least a portion of the non-condensable gas from the separating step into a catalytic reactor comprising the catalyst bed.

3. The method of claim 1, comprising
condensing a part of the treated pyrolytic vapor product in a condenser.

4. The method of claim 1, comprising
recovering heat from the flue gas to a heat transfer medium, by using a heat exchanger arranged in the fluidized bed boiler.

5. The method of claim 4, comprising producing electricity using the heat.

6. The method of claim 1, wherein:
the pressure in the pyrolysis reactor is greater than or equal to the pressure in the catalyst bed, and
the pressure in the fluidized bed boiler is greater than or equal to the pressure in the pyrolysis reactor.

7. The method of claim 1, wherein the pressure of the vapors in the catalyst bed the is less than 2 bar(a).

8. The method of claim 2, comprising:
separating water from the crude condensate to also produce a water rich fraction, and
feeding at least a portion of the water rich fraction to the catalytic reactor.

9. The method of claim 1, wherein:
the raw pyrolyticvapor has a first content of oxygen atoms bound to the oxygenated condensable hydrocarbons, and
the treated pyrolytic vapor product has a second content of oxygen atoms bound to hydrocarbons of the crude condensate, wherein
the second oxygen content is less than the first oxygen content by at least 15%.

10. The method of claim 1, wherein:
the at least a portion of the heated first particulate material from the fluidized bed boiler is transferred into the pyrolysis reactor, and
the char is transferred into the fluidized bed boiler.

11. The method of claim 1, comprising:
heating the second particulate material using the heated first particulate material,
transferring at least a portion of the heated second particulate material into the pyrolysis reactor, and
pyrolyzing the pyrolyzable material in the pyrolysis reactor by contacting the pyrolyzable material with the second particulate material.

* * * * *

UNITED STATES PATENT AND TRADEMARK OFFICE
CERTIFICATE OF CORRECTION

PATENT NO. : 10,711,198 B2  
APPLICATION NO. : 15/565375  
DATED : July 14, 2020  
INVENTOR(S) : Heiskanen et al.

Page 1 of 1

It is certified that error appears in the above-identified patent and that said Letters Patent is hereby corrected as shown below:

In the Claims

<u>Column 33</u>  
Line 12, "pyrolyticvapor" should read --pyrolytic vapor--

<u>Column 34</u>  
Line 5, "bed the is" should read --bed is--  
Line 11, "pyrolyticvapor" should read --pyrolytic vapor--  
Line 31, "second" should read --heated second--

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*